US012284477B2

(12) United States Patent
Zhu et al.

(10) Patent No.: US 12,284,477 B2
(45) Date of Patent: Apr. 22, 2025

(54) ACOUSTIC OUTPUT APPARATUS

(71) Applicant: SHENZHEN SHOKZ CO., LTD., Guangdong (CN)

(72) Inventors: Guangyuan Zhu, Shenzhen (CN); Lei Zhang, Shenzhen (CN); Junjiang Fu, Shenzhen (CN); Xin Qi, Shenzhen (CN); Qingyi Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 255 days.

(21) Appl. No.: 18/064,282

(22) Filed: Dec. 11, 2022

(65) Prior Publication Data

US 2023/0300521 A1 Sep. 21, 2023

Related U.S. Application Data

(63) Continuation of application No. PCT/CN2022/081409, filed on Mar. 17, 2022.

(51) Int. Cl.

| | |
|---|---|
| ***H04R 17/10*** | (2006.01) |
| ***H04R 1/02*** | (2006.01) |
| ***H04R 1/28*** | (2006.01) |

(52) U.S. Cl.

CPC ............ *H04R 1/288* (2013.01); *H04R 1/025* (2013.01); *H04R 17/10* (2013.01)

(58) Field of Classification Search

CPC .. H10N 30/2041; H10N 30/853; H04R 1/288; H04R 1/025; H04R 17/10; H04R 7/26; H04R 7/045; H04R 7/10; H04R 7/22; H04R 17/00

See application file for complete search history.

(56) References Cited

U.S. PATENT DOCUMENTS

| | | | |
|---|---|---|---|
| 4,386,241 | A | 5/1983 | Maeda |
| 4,654,554 | A | 3/1987 | Kishi |
| 10,001,391 | B1 | 6/2018 | Littrell et al. |
| 2003/0048915 | A1 | 3/2003 | Bank |

(Continued)

FOREIGN PATENT DOCUMENTS

| | | | |
|---|---|---|---|
| CN | 104094612 | A | 10/2014 |
| CN | 111147984 | A | 5/2020 |

(Continued)

OTHER PUBLICATIONS

The Extended European Search Report in European Application No. 22821276.7 mailed on Jul. 4, 2023, 9 pages.

(Continued)

*Primary Examiner* — Brian Ensey
(74) *Attorney, Agent, or Firm* — METIS IP LLC

(57) ABSTRACT

An acoustic output apparatus is provided. The acoustic output apparatus may include a vibration assembly and a mass element. The vibration assembly may include a piezoelectric structure and a vibration element. The piezoelectric structure may be configured to convert an electrical signal into mechanical vibrations, and the vibration element may be connected to the piezoelectric structure at a first position of the piezoelectric structure and configured to receive the mechanical vibrations to generate an acoustic signal. The mass element may be connected to the piezoelectric structure at a second position of the piezoelectric structure.

19 Claims, 13 Drawing Sheets

(56) References Cited

U.S. PATENT DOCUMENTS

| | | | |
|---|---|---|---|
| 2003/0053643 A1 | 3/2003 | Bank et al. | |
| 2009/0136705 A1 | 5/2009 | Mao et al. | |
| 2013/0301856 A1 | 11/2013 | Kim et al. | |
| 2015/0195657 A1 | 7/2015 | Ishihara et al. | |
| 2015/0296303 A1 | 10/2015 | Nakamura | |
| 2016/0269820 A1 | 9/2016 | Rousseau et al. | |
| 2019/0327543 A1 | 10/2019 | Ogata et al. | |
| 2019/0394549 A1* | 12/2019 | Starnes ................ | H04R 1/2803 |

FOREIGN PATENT DOCUMENTS

| | | | |
|---|---|---|---|
| CN | 215268715 | U | 12/2021 |
| EP | 0969691 | A1 | 1/2000 |
| JP | S56106497 | A | 8/1981 |
| JP | S5819099 | A | 2/1983 |
| JP | S6022716 | Y2 | 7/1985 |
| JP | S6294099 | A | 4/1987 |
| JP | S62137000 | A | 6/1987 |
| JP | H01135300 | A | 5/1989 |
| JP | H047999 | A | 1/1992 |
| JP | H0678397 | A | 3/1994 |
| JP | 2000175298 | A | 6/2000 |
| JP | 2002320292 | A | 10/2002 |
| JP | 2003219499 | A | 7/2003 |
| JP | 2003304598 | A | 10/2003 |
| JP | 2007300426 | A | 11/2007 |
| JP | 2014049992 | A | 3/2014 |
| JP | 2015149632 | A | 8/2015 |
| JP | 6799274 | B2 | 12/2020 |
| WO | 2010106736 | A1 | 9/2010 |
| WO | 2014034866 | A1 | 3/2014 |
| WO | 2014050439 | A1 | 4/2014 |

OTHER PUBLICATIONS

First Office Action in Russian Application No. 2022133427 mailed on May 10, 2023, 16 pages.

Notice of Reasons for Rejection in Japanese Application No. 2023-511970 mailed on Apr. 22, 2024, 10 pages.

* cited by examiner

ACOUSTIC OUTPUT APPARATUS

CROSS-REFERENCE TO RELATED APPLICATION

This application is a continuation of International Application No. PCT/CN2022/081409, filed on Mar. 17, 2022, the contents of which are hereby incorporated by reference in its entirety.

TECHNICAL FIELD

The present disclosure relates to the field of acoustics, and in particular, to an acoustic apparatus.

BACKGROUND

The acoustic output apparatus driven by piezoelectric ceramics may generate vibrations based on the inverse piezoelectric effect of piezoelectric ceramic materials so as to radiate sound waves outward. Compared with traditional electrodynamic acoustic output apparatus, the acoustic output apparatus driven by piezoelectric ceramics has higher electromechanical conversion efficiency, lower energy consumption, smaller volume, and higher integration. However, compared with the traditional electromagnetic acoustic output apparatus, the acoustic output apparatus driven by piezoelectric ceramics has poorer sound quality due to problems such as insufficient low-frequency output and many vibration modes in the audible range. Beam structures may be used in the acoustic output apparatus driven by piezoelectric ceramics to improve the low-frequency output and reduce low-frequency resonant frequencies. However, the beam structures may introduce more high-order vibration modes in the audible range, especially broadband resonance valleys in the mid-frequency band, which may weaken the mid-frequency output.

Therefore, it is desirable to provide an acoustic output apparatus, thereby suppress the high-order vibration modes in the audible range, and improving the sound quality of the acoustic output apparatus in the middle and low frequency bands.

SUMMARY

The embodiments of the present disclosure provide an acoustic output apparatus, and the acoustic output apparatus may include a vibration assembly and a mass element. The vibration assembly may include a piezoelectric structure and a vibration element. The piezoelectric structure may be configured to convert an electrical signal into mechanical vibrations, and the vibration element may be connected to the piezoelectric structure at a first position of the piezoelectric structure and may be configured to receive the mechanical vibrations to generate an acoustic signal. The mass element may be connected to the piezoelectric structure at a second position of the piezoelectric structure.

In some embodiments, in a range of 50 Hz-5000 Hz, a vibration response curve of the piezoelectric structure at the first position may have a resonance peak and a resonance valley, and the mass element may reduce an amplitude difference between the resonance peak and the resonance valley.

In some embodiments, the piezoelectric structure may have a beam structure, and the first position and the second position may be different positions in a length direction of the beam structure.

In some embodiments, the beam structure may include a fixed end, and a difference between a vibration acceleration level of the beam structure at the first position and a vibration acceleration level of the fixed end may be larger than 20 dB.

In some embodiments, a ratio of a distance between the second position and the fixed end of the beam structure to a length of the beam structure may be larger than ⅓.

In some embodiments, a ratio of an elastic coefficient between the mass element and the piezoelectric structure to a mass of the mass element may be in a range of $(100\pi)^2$-$(10000\pi)^2$.

In some embodiments, a mass of the mass element may be centrally distributed at the second position.

In some embodiments, a mass of the mass element may be uniformly distributed around the second position.

In some embodiments, a mass of the mass element may be in a range of 0.1 g-6 g.

In some embodiments, an elastic coefficient between the mass element and the piezoelectric structure may be in a range of 9 N/m-6×106 N/m.

In some embodiments, the mass element may further be connected to a housing of the acoustic output apparatus.

In some embodiments, a ratio of an elastic coefficient between the mass element and the housing to an elastic coefficient between the mass element and the piezoelectric structure may be less than 10.

In some embodiments, an elastic coefficient between the mass element and the piezoelectric structure may be less than an elastic coefficient between the mass element and the housing.

In some embodiments, the mass of the vibration element may be in a range of 0.1 g-0.9 g, and a ratio of the mass of the mass element to the mass of the vibration assembly may be less than 5.

In some embodiments, the mass of the vibration element may be in a range of 0.9 g-1.8 g, and a ratio of the mass of the mass element to the mass of the vibration assembly may be less than 2.

In some embodiments, the mass of the vibration element may be in a range of 1.8-5 g, and a ratio of the mass of the mass element to the mass of the vibration may be less than 1.

In some embodiments, the mass element may be elastically connected to the piezoelectric structure through an elastic member.

In some embodiments, at least a portion of the mass element may have an elastic structure, and the mass element may be elastically connected to the piezoelectric structure through the elastic structure.

In some embodiments, the elastic structure may include a pore structure.

In some embodiments, a damping material may be disposed in the pore structure.

In some embodiments, the acoustic output apparatus may include a piezoelectric ceramic driven acoustic output apparatus.

Figure 1:
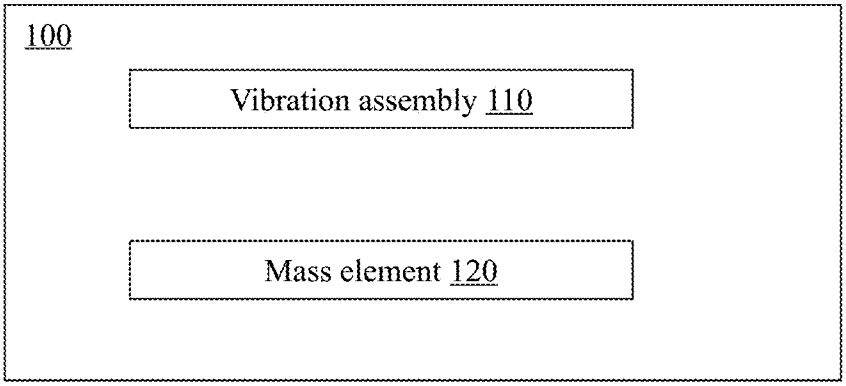
FIG. 1 is a block diagram illustrating an exemplary acoustic output apparatus according to some embodiments of the present disclosure.

Wherein, 100, acoustic output apparatus; 110, vibration assembly; 120, mass element; 211, piezoelectric structure; 212, vibration element; 2111, piezoelectric material layer; 2112, substrate; 2113, fixed end; 2114, free end; 411*a,* beam structure; 430, resonance peak; 440, resonance valley; 420, mass element; 450, resonance peak; 511*a,* beam structure; 512*a,* vibration element; 530, resonance valley; 540, resonance valley; 520, mass element; 621*a,* elastic structure; 621*b,* elastic structure; 6211*b,* high-quality material; 621*c,* elastic structure; 6211*c,* high-quality material; 720, resonance valley; 710, resonance peak; 821, elastic structure; 811, beam structure; 822, mass portion; 921, elastic structure; 911, beam structure; 922, mass portion; 1021, elastic structure; 1023, pore structure; 1122, mass portion; 1121, elastic member; 1220, resonance valley; 1210, resonance peak; 1310, resonance valley; 1320, resonance peak; 1410, resonance peak; 1511, piezoelectric structure; 1520, mass element; 1512, vibration element; 1610, second-order valley; 1620, third-order valley; 1720, mass element; 1711, Piezoelectric structure; 1810, resonance peak; 1820, resonance valley; 1910, resonance peak; 2010, resonance peak; 2110, resonance peak.

DETAILED DESCRIPTION

In order to illustrate the technical solutions of the embodiments of the present disclosure more clearly, the following will briefly introduce the drawings that need to be used in the description of the embodiments. Obviously, the drawings in the following description are only some examples or embodiments of the present disclosure. For those of ordinary skill in the art, without creative work, the present disclosure can be applied to other similar scenarios according to these drawings. Unless it is obvious from the language environment or otherwise stated, the same reference numbers in the drawings represent the same structure or operation.

It should be understood that the terms “system”, “apparatus”, “unit”, “component”, “module” and/or “block” may be a method that is used herein to distinguish different components, elements, parts, sections, or assemblies at different levels. However, the terms may be replaced by other expressions if they serve the same purpose.

As used in the present disclosure and the appended claims, the singular forms “a,” “an,” and “the” include plural referents unless the content clearly dictates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements.

Flowcharts are used in the present disclosure to illustrate operations performed by a system according to an embodiment of the present disclosure. It should be understood that the preceding or following operations are not necessarily performed in the exact order. Instead, the various operations may be processed in reverse order or simultaneously. Further, other actions may be added to these procedures, or an operation or operations may be removed from these procedures.

The embodiments of the present disclosure provide an acoustic output apparatus. The acoustic output apparatus may include a vibration assembly and a mass element. In some embodiments, the vibration assembly may include a piezoelectric structure (e.g., a beam structure) and a vibration element (e.g., a diaphragm, a vibration plate, etc.) for converting an electrical signal into mechanical vibrations. The vibration element may be mechanically connected to the piezoelectric structure at a first position of the piezoelectric structure and is configured to receive the mechanical vibrations to generate an acoustic signal. In some embodiments, the mass element may be connected (e.g., elastically connected) to the piezoelectric structure at the second position of the piezoelectric structure. The first position and the second position may be different positions in a length direction of the piezoelectric structure (e.g., the beam structure). The mass element elastically connected to the piezoelectric structure may reduce the amplitude difference between a resonance peak and a resonance valley of the vibration response of the piezoelectric structure at the first position in a target frequency range (e.g., 50 Hz-5000 Hz), thereby increasing the sound quality of the sound signal. At the same time, the elastic connection may produce a damping effect on the piezoelectric structure, so that a vibration response curve of the acoustic output apparatus in the target frequency range is relatively smooth, thereby further improving the sound quality of the sound signal generated by the acoustic output apparatus.

FIG. 1 is a block diagram illustrating an exemplary acoustic output apparatus according to some embodiments of the present disclosure. As shown in FIG. 1, the acoustic output apparatus 100 may include a vibration assembly 110 and a mass element 120.

In some embodiments, the acoustic output apparatus 100 may include a dynamic acoustic output apparatus, an electrostatic acoustic output apparatus, a piezoelectric acoustic output apparatus, a balanced armature acoustic output apparatus, a pneumatic acoustic output apparatus, an electromagnetic acoustic output apparatus, or the like, or any combination thereof. In some embodiments, the acoustic output apparatus 100 may include a piezoelectric ceramic acoustic output apparatus. In some embodiments, the acoustic output apparatus 100 may be implemented as a pair of glasses, a smart bracelet, a headphone, a hearing aid, a smart helmet, a smart watch, a smart clothing, a smart backpack, a smart accessory, or the like, or any combination thereof. For example, the acoustic output apparatus 100 may be a pair of functional myopia glasses, a pair of reading glasses, a pair of cycling glasses or a pair of sunglasses, etc., and may also be a pair of intelligent glasses (e.g., a pair of audio glasses with earphone function). As another example, the acoustic output apparatus 100 may also be a head-mounted apparatus such as a helmet, an Augmented Reality (AR) apparatus, a Virtual Reality (VR) apparatus, etc. In some embodiments, the augmented reality apparatus or virtual reality apparatus may include a virtual reality headset, a pair of virtual reality glass, an augmented reality helmet, a pair of augmented reality glasses, or the like, or any combination thereof, for example, the virtual reality apparatus and/or the augmented reality apparatus may include a Google Glass, an Oculus Rift, a Hololen, a Gear VR, etc.

The vibration assembly 110 may be configured to convert a signal containing sound information into a sound signal. In some embodiments, the signal containing acoustic information may include an electrical signal, an optical signal, or the like. In some embodiments, the sound signal may include bone conduction sound waves or air conduction sound waves, which may be delivered to the human ear by means of bone conduction or air conduction. For example, the vibration assembly 110 may receive an electrical signal, generate mechanical vibrations, and output sound waves. In some embodiments, the vibration assembly 110 may include a conversion structure for converting a signal containing acoustic information into mechanical vibrations. Exemplary conversion structure may include a dynamic structure, an electrostatic structure, a piezoelectric structure, a balanced armature structure, a pneumatic structure, an electromagnetic structure, or the like, or any combination thereof. In some embodiments, the vibration assembly 110 may include a vibration element (e.g., a diaphragm, a vibration plate) for converting mechanical vibrations into a sound signal. For example, the vibration assembly 110 may include a piezoelectric structure and a vibration element connected to the piezoelectric structure at a first position of the piezoelectric structure. The piezoelectric structure may be configured to convert a signal containing acoustic information into mechanical vibrations, and the vibration element may be configured to receive the mechanical vibrations to generate an acoustic signal. More descriptions of the vibration assembly may be found elsewhere in the present disclosure, see, e.g., FIG. 2 and descriptions thereof.

The mass element 120 may be configured to provide mass to the mechanical vibrations of the vibration assembly 110, thereby changing an amplitude difference between a resonance peak and a resonance valley of the mechanical vibrations generated by the vibration assembly 110. Taking a piezoelectric structure as an example, the mass element 120 may be connected to the piezoelectric structure at a second position of the piezoelectric structure. In some embodiments, the piezoelectric structure may have a beam structure (e.g., a cantilever beam). The first position and the second position may be different positions in a length direction of the beam structure. In some embodiments, the beam structure may include a fixed end. The fixed end may refer to a position on the beam structure where a vibration acceleration or acceleration level is less than a vibration acceleration threshold. For example, the vibration acceleration level of the fixed end may be less than 5 dB, 3 dB, 1 dB, 0.8 dB, 0.6 dB, 0.4 dB, 0.2 dB, 0.05 dB, or the like. In some embodiments, a difference between a vibration acceleration level of the beam structure at the first position and a vibration acceleration level of the fixed end may be larger than 5 dB, 10 dB, 20 dB, 30 dB, 40 dB, or 50 dB, etc. In some embodiments, the vibration response of the piezoelectric structure at the first position may have a resonance peak and a resonance valley in a target frequency range. The mass element 120 may reduce the amplitude difference between the resonance peak and the resonance valley. For example, the target frequency range may include 50 Hz-5000 Hz, 100 Hz-5000 Hz, 200 Hz-4000 Hz, 500 Hz-4000 Hz, 500 Hz-3000 Hz, 500 Hz-2000 Hz, 1000 Hz-2000 Hz, etc.

In some embodiments, the second position may be configured such that in a target frequency range, the mass element 120 may reduce the magnitude difference between the resonance peak and the resonance valley. For example, a ratio of a distance between the second position and the fixed end to a length of the beam structure may be larger than ⅓, ⅖, ⅔, etc. In some embodiments, the mass of the mass element 120 may be configured such that in a target frequency range, the mass element 120 may reduce the amplitude difference between the resonance peak and the resonance valley. In some embodiments, the mass of the mass element 120 may be distributed centrally at the second position or distributed uniformly around the second position. In some embodiments, the mass of mass element 120 may be in a target mass range. For example, the target mass range may include 0.01 g-50 g, 0.0.2 g-40 g, 0.03 g-30 g, 0.04 g-20 g, 0.05 g-10 g, 0.07 g-8 g, 0.09 g-6 g, 0.1 g-6 g, 0.2 g-6 g, 0.5 g-6 g, 1 g-5 g, etc. In some embodiments, the mass of the mass element 120 may be related to the mass of the vibration assembly 110. The mass of the vibration assembly 110 may refer to the total mass of the piezoelectric structure and the vibration element. For example, when the mass of the vibration element is constant, a ratio of the mass of the mass element 120 to the mass of the vibration assembly 110 may be in a preset ratio range. For example, the mass of the vibration element may be in a range of 0.1 g-0.9 g, and the ratio of the mass of the mass element 120 to the mass of the vibration assembly 110 may be less than 5. As another example, the mass of the vibration element may be in a range of 0.9 g-1.8 g, and the ratio of the mass of the mass element 120 to the mass of the vibration assembly 110 may be less than 2. As another example, the mass of the vibration element may be in a range of 1.8 g-5 g, and the ratio of the mass of the mass element 120 to the mass of the vibration assembly 110 may be less than 1.

In some embodiments, the connection between the mass element 120 and the piezoelectric structure may include an elastic connection. For example, the acoustic output apparatus 100 or the mass element 120 may include an elastic member (not shown) through which the mass element 120 may be elastically connected to the piezoelectric structure at the second position of the piezoelectric structure. As another example, at least a portion of the mass element 120 may have an elastic structure, and the mass element 120 may be elastically connected to the piezoelectric structure at the second position of the piezoelectric structure through the elastic structure. In some embodiments, a first elastic coefficient between the mass element 120 and the piezoelectric structure may be configured such that in the target frequency range, the mass element 120 may reduce the amplitude difference between the resonance peak and the resonance valley. For example, the first elastic coefficient between the mass element 120 and the piezoelectric structure may be in a range of 9 N/m-6×$10^6$ N/m, 50 N/m-6×$10^6$ N/m, 100 N/m-6×$10^6$ N/m, 1000 N/m-6×$10^6$ N/m, $10^4$ N/m-6×$10^6$ N/m, 5×$10^4$ N/m-6×$10^6$ N/m, 5×$10^5$ N/m-6×$10^6$ N/m, 9'$10^5$ N/m-6×$10^6$ N/m, $10^6$ N/m-6×$10^6$ N/m, etc.

In some embodiments, the mass element 120 may be connected to a housing of the acoustic output apparatus 100. The connection may include an elastic connection. For example, the acoustic output apparatus 100 or the mass element 120 may include an elastic member (not shown) through which the mass element 120 may be elastically connected to the housing of the acoustic output apparatus 100. As another example, at least a portion of the mass element 120 may have an elastic structure, and the mass element 120 may be elastically connected to the housing of the acoustic output apparatus 100 through the elastic structure. The elastic connection between the mass element 120 and the housing may have a second elastic coefficient. In some embodiments, the first elastic coefficient may be less than the second elastic coefficient. In some embodiments, a ratio of the second elastic coefficient to the first elastic coefficient may be less than a preset threshold. For example, the ratio of the second elastic coefficient to the first elastic coefficient may be less than 10.

In some embodiments, the mass element 120 may have any shape, such as a cylinder, a cuboid, a cone, a truncated cone, a sphere and other regular structures or irregular structures. In some embodiments, the material of the mass element 120 may include, but is not limited to, any rigid material such as a plastic, a wood, and a metal. In some embodiments, the material of the mass element 120 may further include various metamaterials that is beneficial to expand the audio frequency bandwidth of the acoustic output apparatus 100, such as a negative stiffness material, a cubic stiffness material, etc. In some embodiments, the mass element 120 may also be configured to provide damping to the mechanical vibrations of the vibration assembly 110. The damping may be configured to smooth response curves of the acoustic output apparatus 100 in the low frequency band. For example, the mass element 120 itself may provide damping to the vibration assembly 110. As another example, the mass element 120 may include a damping portion that may provide damping to the vibration assembly 110. In some embodiments, the mass element 120 may provide damping to the mechanical vibrations of the vibration assembly 110 by elastically connecting to the vibration assembly 110. More descriptions of the mass element 120 may be found elsewhere in the present disclosure, see, e.g., FIG. 3 and descriptions thereof.

It should be understood that the descriptions of the acoustic output apparatus 100 shown in FIG. 1 is for illustrative purposes only and is not intended to limit the scope of the present disclosure. Various variations and modifications may be made by those skilled in the art under the guidance of the present disclosure. And these variations and modifications may fall within the protection scope of the descriptions. In some embodiments, the components shown in the figures may be adjusted according to actual conditions. For example, the acoustic output apparatus 100 may include a plurality of mass elements. As another example, the acoustic output apparatus 100 may include an elastic element for providing elasticity between the mass element and the vibration assembly.

Figure 2:
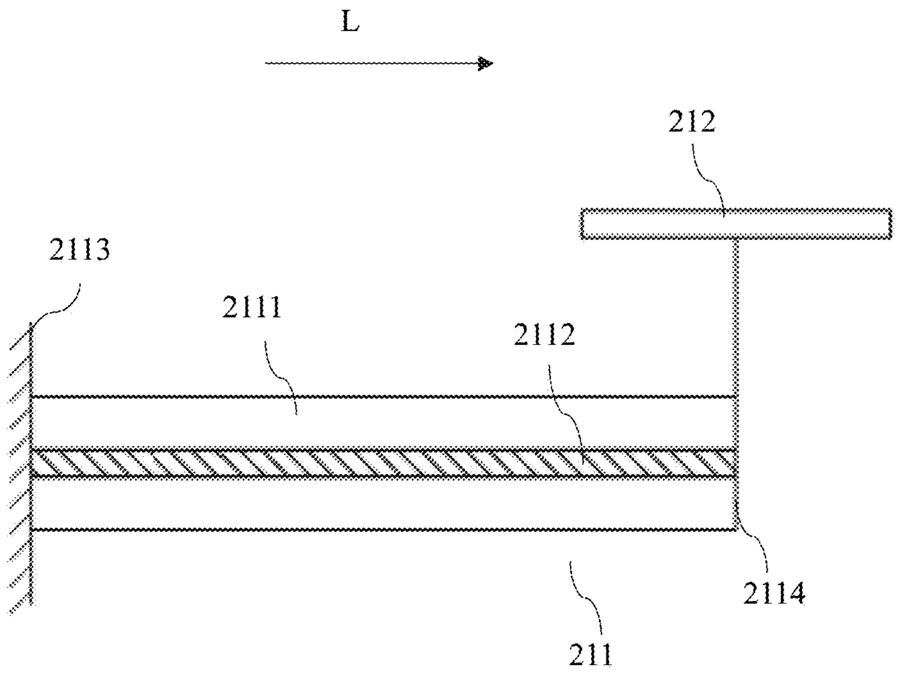
FIG. 2 is a schematic diagram illustrating the structure of an exemplary vibration assembly according to some embodiments of the present disclosure.

FIG. 2 is a schematic diagram illustrating the structure of an exemplary vibration assembly according to some embodiments of the present disclosure. As shown in FIG. 2, the vibration assembly may include a piezoelectric structure 211 and a vibration element 212. The vibration element 212 may be connected to the piezoelectric structure 211. The connection may include a bolt connection, a riveting, an interference fit, a snap connection, a bonding, an injection molding, a welding, a magnetic attraction, or the like, or any combination thereof.

The piezoelectric structure 211 may be configured to convert an electrical signal into mechanical vibrations. In some embodiments, the piezoelectric structure may include a piezoelectric material. Exemplary piezoelectric materials may include a piezoelectric crystal, a piezoelectric ceramic, a piezoelectric polymer, or the like. As shown in FIG. 2, the piezoelectric structure 211 may have a beam structure (e.g., a cantilever beam), and the beam structure may include a piezoelectric material layer 2111 and a metal substrate 2112. The metal substrate 2112 may extend along the length direction of the beam structure. In a direction perpendicular to the length direction (e.g., the length direction L in FIG. 2) of the beam structure, the metal substrate 2112 may overlap with the piezoelectric material layer 2111. In some embodiments, the beam structure may include n (n is a positive integer larger than 1) layers of piezoelectric material layers 2111 and n-1 layers of metal substrates 2112. The metal substrates 2112 and the piezoelectric material layers 2111 may be overlapped along the direction perpendicular to the length direction of the beam structure.

The beam structure may include a fixed end 2113 and a free end 2114. The fixed end may refer to a position on the beam structure where a vibration acceleration or acceleration level is less than a vibration acceleration threshold. For example, the vibration acceleration level of the fixed end 2113 may be less than 5 dB, 3 dB, 1 dB, 0.8 dB, 0.6 dB, 0.4 dB, 0.2 dB, or 0.05 dB, etc. In some embodiments, the fixed end 2113 may be connected to a fixed position or structure of the acoustic output apparatus. The fixed position or structure may refer to a position or a structure on the acoustic output apparatus where the vibration acceleration or acceleration level is less than the vibration acceleration threshold. For example, the acoustic output apparatus may include a housing (not shown in FIG. 2), the beam structure may be disposed in the housing, and the fixed end 2113 of the beam structure may be fixedly connected to the housing. As another example, the acoustic output apparatus may include a counterweight, and the fixed end 2113 of the beam structure may be fixedly connected to the counterweight. The free end 2114 may refer to an end of the beam structure that may vibrate freely.

The vibration element 212 may be configured to receive mechanical vibrations and convert the mechanical vibrations into a sound signal to output. In some embodiments, the vibration element 212 may be connected to the piezoelectric structure 211 (or beam structure) at a first position of the piezoelectric structure 211 (or beam structure) to receive mechanical vibrations generated by the piezoelectric structure 211. In some embodiments, the first position may be a position on the beam structure where the amplitude of mechanical vibration is relatively large. A difference between the vibration acceleration level of the beam structure at the first position and the vibration acceleration level of the fixed end 2113 may be larger than a difference threshold. For example, the difference between the vibration acceleration level of the first position and the vibration acceleration level of the fixed end 2113 may be larger than 5 dB, 10 dB, 20 dB, 30 dB, 40 dB, 50 dB, etc. For example, the first position to which the vibration element 212 may be connected may be the free end 2114. In some embodiments, when the acoustic output apparatus is an air conduction acoustic output apparatus, the vibration element 212 may be a diaphragm. The diaphragm may receive the mechanical vibrations generated by the piezoelectric structure 211 and further push the air to vibrate to generate a sound signal. In some embodiments, when the acoustic output apparatus is a bone conduction acoustic output apparatus, the vibration element 212 may be a vibration plate, and the vibration plate may be in contact with the human body to transmit vibrations, thereby generating a sound signal.

A mass element (not shown in FIG. 2) may be connected to the piezoelectric structure 211 at a second position of the piezoelectric structure 211. In some embodiments, the first position and the second position may be different positions in the length direction of the beam structure. In some embodiments, the second position may be located between the fixed end 2113 of the beam structure and the first position. In some embodiments, a ratio of a distance between the second position and the fixed end 2113 of the beam structure to the length of the beam structure may be larger than ⅓, ⅖, ⅔, or the like. In some embodiments, the piezoelectric structure 211 may resonate when converting an electrical signal into mechanical vibrations. Correspondingly, the vibration response of the piezoelectric structure 211 at the first position may have a resonance peak and a resonance valley. For example, in the target frequency range, the vibration response of the piezoelectric structure 211 at the first position may have a resonance peak and a resonance valley. Exemplary target frequency ranges may include 50 Hz-5000 Hz, 100 Hz-5000 Hz, 200 Hz-4000 Hz, 500 Hz-4000 Hz, 500 Hz-3000 Hz, 500 Hz-2000 Hz, 1000 Hz-2000 Hz, etc. The mass element may be configured to reduce positions where the resonance peak and the resonance valley occur and an amplitude difference between the resonance peak and the resonance valley at the first position, so that a vibration waveform of the vibration element at the first position may be relatively smoother. In some embodiments, the second position may be located at an antinode (i.e., a position with the largest amplitude) of the mechanical vibrations of the beam structure at a specific frequency, such that the mechanical vibrations of an antinode region (i.e., a vibration region within a certain range to the left and/or right of the a position with the largest amplitude) at the specific frequency may be damped by the mass element and the vibrational energy may be partially transferred to the first position,. In such cases, the mechanical vibrations at the first position at the specific frequency may be enhanced. The specific frequency may be a frequency corresponding to a resonance valley at the first position of the piezoelectric structure. Since the vibrations of the first position of the piezoelectric structure at the resonance valley is enhanced, and the vibration at the resonance peak is reduced by the damping provided by the mass element, a vibration mode of the piezoelectric structure at the first position may be smoothed, thereby improving the sound quality effectively.

Figure 3A:
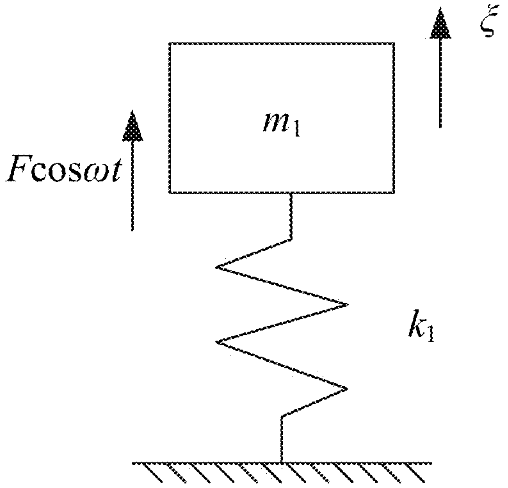
FIG. 3A is a schematic diagram illustrating an equivalent structure of an exemplary beam structure at a second position according to some embodiments of the present disclosure.
Figure 3B:
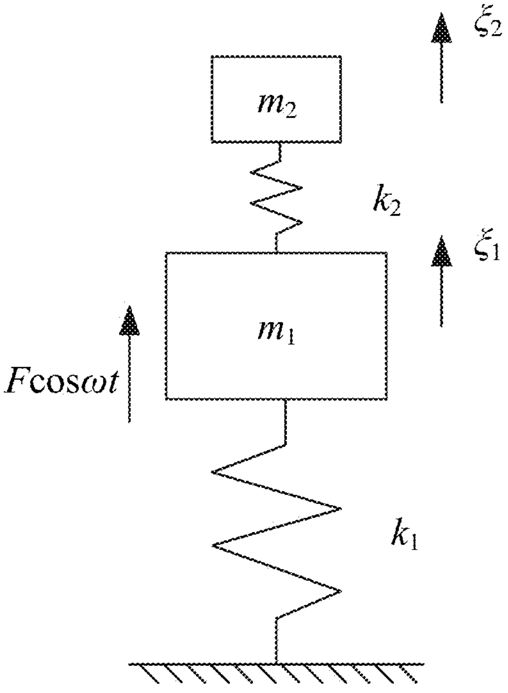
FIG. 3B is a schematic diagram illustrating an equivalent structure of an exemplary mass element connected to a beam structure at a second position according to some embodiments of the present disclosure.

The principle that the mass element changes the vibration mode of the piezoelectric structure may be exemplarily described below with reference to FIG. 3A and FIG. 3B. FIG. 3A is a schematic diagram illustrating an equivalent structure of an exemplary beam structure at a second position according to some embodiments of the present disclosure. FIG. 3B is a schematic diagram illustrating an equivalent structure of an exemplary mass element connected to a beam structure at a second position according to some embodiments of the present disclosure.

As shown in FIG. 3A, for a beam structure under a mechanical vibration state, the vibrations at the second position may be equivalent to a forced vibration of a single-degree-of-freedom system, and a vibration equation thereof may be (disregarding the influences of the damping in the system):

$$m_1 \frac{d^2 \xi}{dt^2} + k_1 \xi = F \cos \omega t, \tag{1}$$

wherein, $m_1$ represents the mass of the beam structure at the second position (i.e., the antinode region), $k_1$ represents an equivalent elastic coefficient at the second position, $\xi$ represents a vibration displacement at the second position, F represents an exciting force, $\omega$ represents an angular frequency of the exciting force, and F cos $\omega$t represents a component force of the exciting force along a vibration direction of the second position. A special solution of equation (1) may be:

$$\xi = \frac{F/k_1}{\left(1 - \frac{\omega^2}{\omega_0^2}\right)} \cos \omega t, \tag{2}$$

wherein, $\omega_0$ ($\omega_0=\sqrt{k_1/m_1}$) represents a natural angular frequency at the second position. Disregarding the damping, when the angular frequency co of the exciting force is equal to the natural angular frequency $\omega_0$ of the second position, resonance may occur at the second position, and the amplitude (displacement $\xi$) may be infinite. In view of the effect of the damping, the amplitude peaks at the second position, that is, the second position (or the antinode region) may be a position with the largest displacement on the beam structure in the direction perpendicular to the length direction.

In some embodiments, the mass element may be elastically connected to the piezoelectric structure. For example, the mass element may be elastically connected to the piezoelectric structure through an elastic element (e.g., an elastic element disposed independently of the mass element). As another example, the mass element may be elastically connected to the piezoelectric structure through an elastic structure thereof (e.g., an elastic structure integrated with the mass element). In some embodiments, the mass element may be elastically connected to the beam structure at the second position. The vibrations of the beam structure at the second position when the mass element is connected to the beam structure may be equivalent to forced vibrations of a two-degree-of-freedom system as shown in FIG. 3B. As shown in FIG. 3B, a mass portion with mass $m_2$ and an elastic portion with an elastic coefficient $k_2$ may represent the mass element elastically connected to the beam structure, and a vibration equation thereof may be (disregarding the influence of damping in the system):

$$\begin{cases} m_1 \frac{d^2\xi_1}{dt^2} + (k_1 + k_2)\xi_1 - k_2\xi_2 = F \cos \omega t \\ m_2 \frac{d^2\xi_2}{dt^2} + k_2(\xi_2 - \xi_1) = 0 \end{cases}, \tag{3}$$

wherein, $\xi_2$ represents a vibration displacement of the mass element, and the meanings of other symbols may be found in equation (1) and related descriptions thereof (wherein $\xi_1$ is the same as $\xi$). A special solution of equation (3) may be:

$$\begin{cases} \xi_1 = \frac{\left(1 - \frac{\omega^2}{\omega_r^2}\right) F/k_1}{\left(1 + \alpha\frac{\omega_r^2}{\omega_0^2} - \frac{\omega^2}{\omega_0^2}\right)\left(1 - \frac{\omega^2}{\omega_r^2}\right) - \frac{k_2}{k_1}} \cos \omega t \\ \xi_2 = \frac{F/k_1}{\left(1 + \alpha\frac{\omega_r^2}{\omega_0^2} - \frac{\omega^2}{\omega_0^2}\right) - \left(1 - \frac{\omega^2}{\omega_r^2}\right) - \frac{k_2}{k_1}} \cos \omega t \end{cases}, \tag{4}$$

wherein, $\omega_r$ ($\omega_r^2=k_2/m_2$) represents a natural angular frequency of the mass element, and $\alpha=m_2/m_1$ is a mass ratio of the mass element to the second position. Accordingly, the natural angular frequency $\omega_r$ of the mass element may be adjusted to be equal to the angular frequency co of the exciting force, so that the vibration displacement $\xi_1$ of the second position may be zero. In such cases, a vibration equation of the mass element may be:

$$\xi_2 = -\frac{F}{k_2}\cos \omega t, \omega = \omega_r. \tag{5}$$

Equation (5) may be written as:

$$k_2 \cdot \xi_2|_{\omega_r=\omega} + F \cos \omega t = 0. \tag{6}$$

According to equation (6), a resultant force of the elastic coefficient $k_2$ of the mass element and the exciting force F cos $\omega$t at the second position of the beam structure is zero. Disregarding the damping, the vibrations of the antinode may be transferred to the mass element by adding a mass element at the second position of the beam structure, which may reduce the large vibrations of the beam structure at the second position. In view of the effect of the damping, the vibration mode of the beam structure at the second position may be significantly suppressed or destroyed by adding a mass element at the second position of the beam structure. In such cases, the mechanical vibrations generated by the beam structure may be transmitted to the first position, so that the vibration amplitude of the first position may be increased, and the vibration mode may be smoother, thereby improving the sound quality output by the acoustic output apparatus effectively.

In some embodiments, the natural angular frequency $\omega_r$ of the mass element may be written as $\omega_r^2=k_2/m_2$. Thus, the elastic coefficient between the mass element and the piezoelectric structure and/or the mass of the mass element may be configured to set the natural angular frequency $\omega_r$ of the mass element, so that the mass element may reduce the amplitude difference between the resonance peak and the resonance valley at the first position at the target frequency. For example, the elastic coefficient and/or the mass of the mass element may be configured such that the natural angular frequency $\omega_r$ of the mass element is the same as or similar to a preset target frequency, thereby reducing the amplitude difference between the resonance peak and the resonance valley at the first position at the target frequency. Merely by way of example, the target frequency range may be in a range of 50 Hz-5000 Hz. Correspondingly, the elastic coefficient and/or the mass of the mass element may be configured so that a ratio of the elastic coefficient between the mass element and the piezoelectric structure to the mass of the mass element is in the range of $(100\pi)^2$-$(10000\pi)^2$. In some embodiments, the mass of the mass element may be in a target mass range. For example, the target mass range may include 0.01 g-50 g, 0.0.2 g-40 g, 0.03 g-30 g, 0.04 g-20 g, 0.05 g-10 g, 0.07 g-8 g, 0.09 g-6 g, 0.1 g-6 g, 0.2 g-6 g, 0.5 g-6 g, 1 g-5 g, etc. Correspondingly, to reduce the amplitude difference between the resonance peak and the resonance valley in the target frequency range, the elastic coefficient between the mass element and the piezoelectric structure may be in a range of 9 N/m-$6\times10^6$ N/m.

It should be noted that the above descriptions about the vibration assembly and the mass element are only for examples and illustration, and do not limit the scope of application of the present disclosure. For those of ordinary skill in the art, various variations and modifications to the vibration assembly and the mass element may be made under the guidance of the present disclosure. However, these variations and modifications are still within the scope of the present disclosure. For example, the fixed end 2113 shown in FIG. 2 may be located at the end of the beam structure. It should be noted that, the fixed end 2113 may also be arranged at other positions of the beam structure. As another example, the mass element may include a plurality of masses that are individually arranged.

Figure 4A:
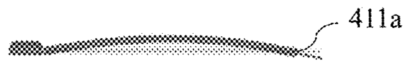
FIG. 4A is a schematic diagram illustrating vibrations of an exemplary beam structure according to some embodiments of the present disclosure.
Figure 4B:
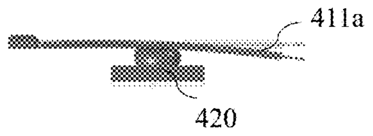
FIG. 4B is a schematic diagram illustrating vibrations of a beam structure connected to a mass element according to some embodiments of the present disclosure.
Figure 4C:
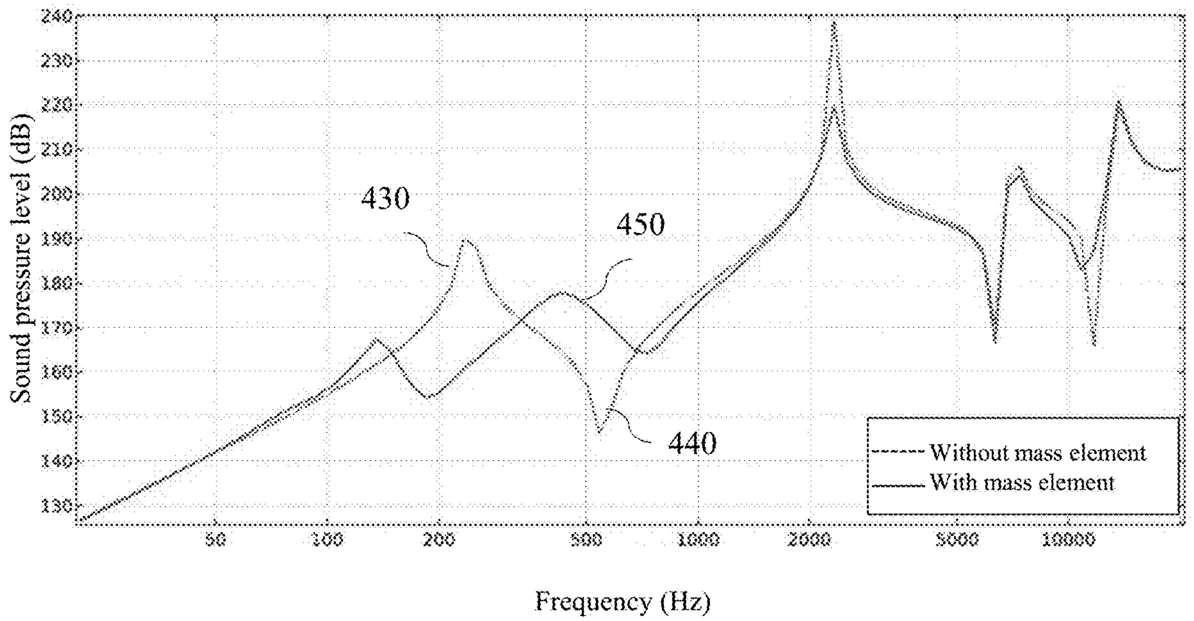
FIG. 4C is a graph illustrating vibration response curves of a beam structure at a first position when the beam structure is connected or not connected to a mass elements according to some embodiments of the present disclosure.

The influence of the mass element on the vibration state of the beam structure may be described below in connection with FIGS. 4A-4C and FIGS. 5A-5C. FIG. 4A is a schematic diagram illustrating vibrations of an exemplary beam structure according to some embodiments of the present disclosure. FIG. 4B is a schematic diagram illustrating vibrations of a beam structure connected to a mass element according to some embodiments of the present disclosure. FIG. 4C is a graph illustrating vibration response curves of a beam structure at a first position when the beam structure is connected or not connected to a mass elements according to some embodiments of the present disclosure.

The beam structure 411*a* shown in FIG. 4A may resonate during mechanical vibrations (e.g., when an angular frequency or a frequency of the mechanical vibration is equal to an angular frequency or a frequency of the beam structure 411*a* in the mode shape). When the beam structure 411*a* resonates, a vibration amplitude of a middle portion of the beam structure 411*a* may be the largest, and less mechanical vibration may be transmitted to the free end (i.e., the first position), which may result in that a vibration amplitude at the first position is relatively small. Correspondingly, the vibration response of the beam structure 411*a* at the first position may include a resonance valley. The vibration response curve of the beam structure 411*a* at the first position is shown by the dotted line in FIG. 4C. As shown in FIG. 4C, the vibration response curve of the beam structure 411*a* at the first position of may have obvious resonance peak 430 and resonance valley 440 in the range of 100 Hz-1000 Hz (i.e., the middle and low frequency bands), which may result in that the output of vibrations of the acoustic output apparatus in the middle and low frequency bands is attenuated, thereby affecting the quality of the output sound.

The output of the vibrations of the acoustic output apparatus in the middle frequency band may be enhanced by increasing the vibration amplitude at the first position. As shown in FIG. 4B, the mass element 420 may be elastically connected to the antinode region (i.e., the second position) of the mechanical vibrations of the beam structure 411*a*. The mass element 420 may be configured to suppress the vibration mode of the antinode region, and then change the vibration mode of the first position, so that the beam structure may have a relatively smooth vibration response curve, thereby improving the output of the acoustic output apparatus in the middle frequency band. The vibration response curve of the beam structure 411*a* at the first position when the mass element 420 is connected to the beam structure 411*a* is shown as the solid line in FIG. 4C. As shown in FIG. 4C, in the range of 100 Hz-1000 Hz (e.g., around 500 Hz), the vibration response curve of the beam structure 411 a at the first position may include a resonance peak 450. Compared with the beam structure 411 without the mass element, the amplitude difference between the resonance peak and the resonance valley of the vibration response curve at the first position is significantly reduced, and the vibration response curve in the middle and low frequency bands is relatively flatter, so that the sound quality of the acoustic output apparatus in the middle and low frequency bands may be improved. In some embodiments, the elastic connection between the mass element and the beam structure 411*a* may have a certain damping effect, which may cause a transition between the resonance peak and resonance valley in the middle and low frequency bands smooth without being too sharp due to the transition, thereby improving the sound quality.

Figure 5A:
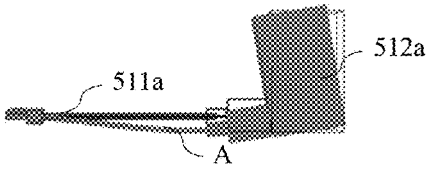
FIG. 5A and FIG. 5B are schematic diagrams illustrating vibrations of exemplary vibration assemblies according to some embodiments of the present disclosure.
Figure 5B:
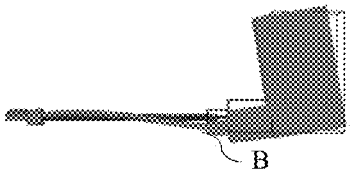
Figure 5C:
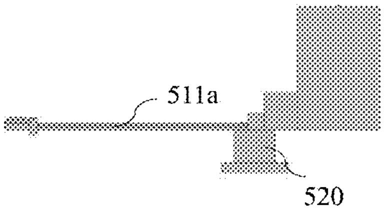
FIG. 5C is a schematic diagram illustrating a vibration assembly connected to a mass element according to some embodiments of the present disclosure.
Figure 5D:
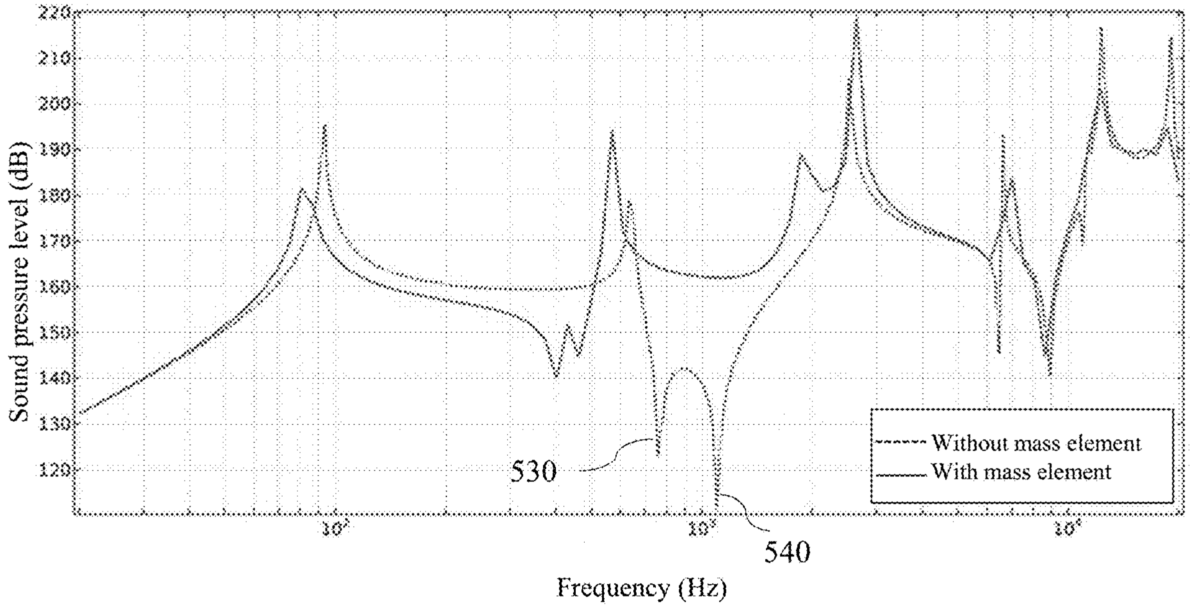
FIG. 5D is a graph illustrating vibration response curves of a vibration assembly at a first position when the vibration assembly is connected or not connected to a mass element according to some embodiments of the present disclosure.

FIG. 5A and FIG. 5B are schematic diagrams illustrating vibrations of exemplary vibration assemblies according to some embodiments of the present disclosure. FIG. 5C is a schematic diagram illustrating a vibration assembly connected to a mass element according to some embodiments of the present disclosure. FIG. 5D is a graph illustrating vibration response curves of a vibration assembly at a first position when the vibration assembly is connected or not connected to a mass element according to some embodiments of the present disclosure.

The vibration assembly shown in FIGS. 5A and 5B may include a beam structure 511*a* and a vibration element 512*a*. The vibration element 512*a* may be connected to the free end (i.e., the first position) of the beam structure 511*a*. The vibration assembly shown in FIGS. 5A and 5B may correspond to the vibration modes of the beam structure at different frequencies, respectively. In the vibration modes corresponding to FIGS. 5A and 5B, the vibration amplitude of the beam structure at the first position may be relatively small, while the vibration amplitude at other positions may be relatively large. For example, as shown in FIG. 5A, the beam structure 511*a* has the largest vibration amplitude at position A, and less mechanical vibrations may be transmitted to the free end (i.e., the first position). In such cases, the beam structure 511*a* may have a small vibration amplitude at the first position. The vibration response curve of the beam structure 511*a* at the first position is shown by the dotted line in FIG. 5D. According to FIG. 5D, in the range of 500 Hz-1000 Hz, the vibration response curve of the vibration assembly at the first position may include a resonance valley 530. As another example, as shown in FIG. 5B, the beam structure 511*a* has the largest vibration amplitude at position B, and less mechanical vibrations may be transmitted to the free end (i.e., the first position). In such cases, the beam structure 511*a* may have a small vibration amplitude at the first position. According to FIG. 5D, in the range of 1000 Hz-2000 Hz, the vibration response curve of the vibration assembly at the first position may include a resonance valley 540. In some embodiments, the resonance valley 530 in the range of 500 Hz-1000 Hz as shown in FIG. 5A may be referred to as a second-order valley, and the resonance valley 540 in the range of 1000 Hz-2000 Hz as shown in FIG. may be referred to as a third-order valley.

In order to improve the second-order valley and the third-order valley, as shown in FIG. 5C, a mass element 520 may be elastically connected to the antinode region of the third-order valley of the mechanical vibrations of the beam structure 511*a* (i.e., the region where the position B is located). The mass element 520 may be configured to suppress the vibration mode of the antinode region to change the vibration mode of the beam structure 511*a* at the first position. The vibration response curve of the vibration assembly at the first position when the mass element 520 is connected to the vibration assembly is the solid line curve shown in FIG. 5D. As shown in FIG. 5D, the original second-order valley and the original third-order valley have been significantly improved. Compared with the vibration assembly without the mass element, the amplitude difference between the resonance peak and the resonance valley is significantly reduced, so that the response curve in the middle and low frequency bands is relatively flat, which may improve the sound quality of the acoustic output apparatus in the middle and low frequency bands.

In some embodiments, the mass element may include a mass portion having mass and an elastic portion having elasticity. The mass element may be elastically connected to the piezoelectric structure through the elastic portion. In some embodiments, the mass element may further include a damping portion for increasing the vibration damping of the piezoelectric structure, and the damping portion may be configured to smooth a transition of the vibration response curve. In some embodiments, the mass portion may include metallic, non-metallic materials, or the like. The density of the material may be in a preset density range. The preset density range may include 0.01-100 g/cm$^3$, 0.05-80 g/cm$^3$, 0.1-60 g/cm$^3$, 0.2-50 g/cm$^3$, 0.3-40 g/cm$^3$, 0.4-30 g/cm3, 0.5-20 g/cm$^3$, etc. In some embodiments, the damping portion may be implemented as a damping material such as rubber, or the like.

In some embodiments, the elastic portion may be mixed with the mass portion. Alternatively, the elastic portion may be a portion of the mass element. For example, at least a portion of the mass element may be an elastic structure. The mass element may be elastically connected to the piezoelectric structure through the elastic structure. Exemplary elastic structures may include a spring structure. In some embodiments, the elastic structure may be made of an elastic material. Exemplary elastic materials may include a rubber, a latex, a silicone, a sponge, or the like, or any combination thereof. In some embodiments, the elastic structure may be used as both the elastic portion and the mass portion. For example, the elastic structure may include a metal rubber of higher mass and/or density. As another example, a higher quality material may be incorporated into the elastic structure, such as a metallic powder incorporated into a sponge. In some embodiments, the elastic structure may include a damping part. For example, an elastic structure may be made of a damping material (e.g., nitrile). As another example, the damping material may be added to the elastic structure, such as damping paint coated on the surface of the elastic structure or penetrated into an interior of the elastic structure.

Figure 6:
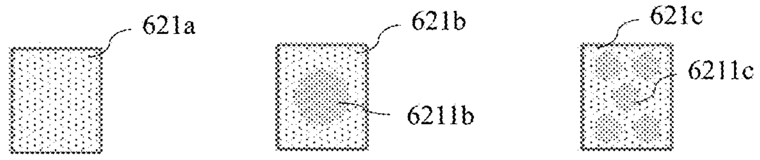
FIG. 6 is a schematic diagram illustrating a structure with a mixture of an elastic portion and a mass portion according to some embodiments of the present disclosure.

FIG. 6 is a schematic diagram illustrating a structure with a mixture of an elastic portion and a mass portion according to some embodiments of the present disclosure. As shown in FIG. 6, in some embodiments, the high-quality material may be uniformly distributed in the elastic structure 621*a*. For example, the silica gel may be uniformly doped with a certain quality of metal powder and then integrally formed. In some embodiments, the high-quality material 6211*b* may be disposed at a center of the elastic structure 621*b*. In some embodiments, the high-quality material 6211*c* may be disposed in a plurality of positions in the elastic structure 621*c*.

Figure 7:
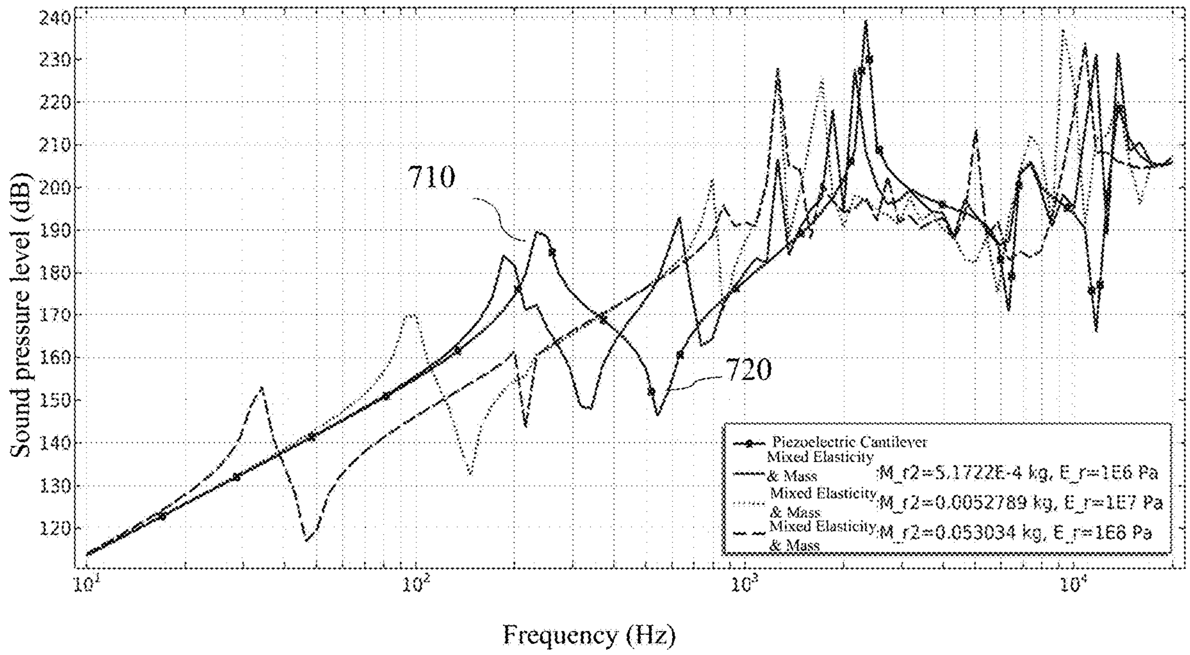
FIG. 7 is a graph illustrating vibration response curves of a beam structure at a first position when the beam structure is connected to a mass element in which an elastic portion is mixed with a mass portion according to some embodiments of the present disclosure.

FIG. 7 is a graph illustrating vibration response curves of a beam structure at a first position when the beam structure is connected to a mass element in which an elastic portion is mixed with a mass portion according to some embodiments of the present disclosure. As shown in FIG. 7, "M_r2=5.1722E−4 kg, E_r=1E6 Pa" represents the vibration response curve at the first position when the total mass of the mass element is 0.51722 g and the elastic modulus between the mass element and the beam structure is $10^6$ Pa. According to FIG. 7, when different mass elements are connected to the beam structure, in the range of 100 Hz-1000 Hz, the resonance valley 720 in the vibration response curves of the beam structure at the first position have been effectively improved, and the amplitude difference between the resonance peak 710 and the resonance valley 720 have been reduced. Therefore, the amplitude difference between the resonance peak and the resonance valley of the piezoelectric structure at the first position in the target range may be reduced by connecting the mass element with mixed elastic portion and mass portion to the piezoelectric structure. In addition, as the mass of the mass element increases, the resonance peak in the low frequency range (e.g., 80 Hz-300 Hz) moves to the zero point of the abscissa. Correspondingly, the low frequency sensitivity of the acoustic output apparatus may decrease. In some embodiments, in order to ensure the low frequency sensitivity of the acoustic output apparatus, the total mass of the mass element in which the elastic portion is separated from the mass portion may be in a target mass range. For example, the target mass range may include 0.01 g-50 g, 0.0.2 g-40 g, 0.03 g-30 g, 0.04 g-20 g, 0.05 g-10 g, 0.07 g-8 g, 0.09 g-6 g, 0.1 g-6 g, 0.2 g-6 g, 0.5 g-6 g, 1 g-5 g, etc.

Figure 8:
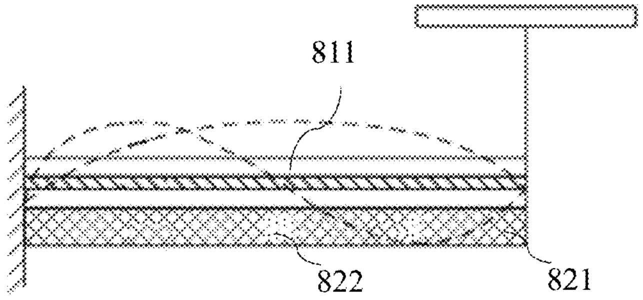
FIG. 8 is a schematic diagram illustrating a mass element with uniformly distributed elasticity connected to a beam structure according to some embodiments of the present disclosure.
Figure 9:
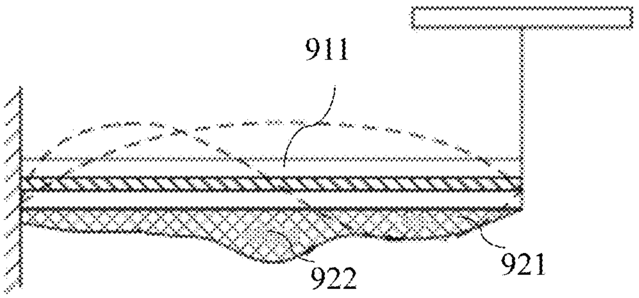
FIG. 9 is a schematic diagram illustrating a mass element with non-uniformly distributed elasticity according to some embodiments of the present disclosure.
Figure 10:
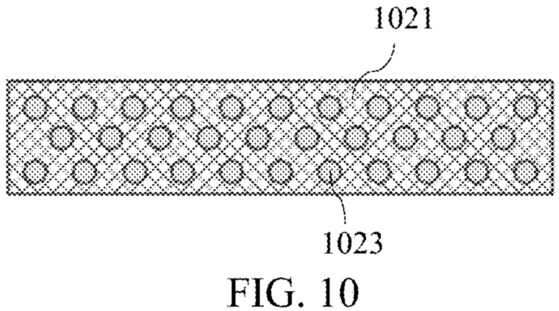
FIG. 10 is a schematic diagram illustrating a mass element with uniformly distributed mass and/or uniformly distributed damping according to some embodiments of the present disclosure.

For example, FIGS. 8-10 illustrate some embodiments in which a mass element in which the elastic portion is mixed with the mass portion is connected to the beam structure. FIG. 8 is a schematic diagram illustrating a mass element with uniformly distributed elasticity connected to a beam structure according to some embodiments of the present disclosure. FIG. 9 is a schematic diagram illustrating a mass element with non-uniformly distributed elasticity according to some embodiments of the present disclosure. FIG. 10 is a schematic structural diagram illustrating a mass element with uniformly distributed mass and/or uniformly distributed damping according to some embodiments of the present disclosure.

As shown in FIG. 8, the mass element may include an elastic structure 821. The elastic structure 821 may extend along the length direction of the beam structure 811. The elastic structure 821 may include a plurality of mass portions 822. In some embodiments, the elasticity of the elastic structure 821 may be uniformly distributed along the length direction of the beam structure 811. The mass portions 822 in the elastic structure 821 may be non-uniformly distributed along the length direction of the beam structure 811. For example, as shown in FIG. 8, the vibration modes of the beam structure 811 in different frequency bands may be shown as dotted lines in the figure. The mass portions 822 in the elastic structure 821 may be distributed at a plurality of second positions. The plurality of second positions may be respectively disposed in the antinode regions of the vibrations of the beam structure 811 in different frequency bands, so that the amplitude differences between the resonance peaks and the resonance valleys at the first position in the different frequency bands may be reduced, thereby improving the sound quality of the acoustic output apparatus in the different frequency bands.

As shown in FIG. 9, the mass element may include an elastic structure 921. The elastic structure 921 may extend along the length direction of the beam structure 911, and the elastic structure 921 may include a plurality of mass portions 922. In some embodiments, the elastic structures 921 may be non-uniformly distributed along the length direction of the beam structure 911. For example, a region of the elastic structure 921 in which the mass portion 922 is distributed may have larger elasticity than a region without the mass portion 922. As another example, a region of the elastic structure 921 in which the mass portion 922 of larger mass is distributed may have larger elasticity than a region with a mass portion 922 of a less mass.

As shown in FIG. 10, the elastic structure 1021 may include a pore structure 1023. The pore structure 1023 may include at least one pore. In some embodiments, the pore structure may be uniformly distributed in the elastic structure 1021. In some embodiments, the pore structure 1023 may include a damping material. The damping material may smooth the transition of the vibration response curve of the acoustic output apparatus, thereby improving the sound quality effectively.

In some embodiments, the elastic portion may be separated from the mass portion. For example, the elastic portion may include an elastic member through which the mass element may be elastically connected to the piezoelectric structure. Exemplary elastic members may include a foam, a silicone, spring, a compression spring, or the like, or any combination thereof. In some embodiments, the mass portion may be implemented as a metallic, a non-metallic material, or the like. The density of the material may be in a preset density range. The preset density range may include 0.01 g/cm$^3$-100 g/cm$^3$, 0.05 g/cm$^3$-80 g/cm$^3$, 0.1 g/cm$^3$-60 g/cm$^3$, 0.2 g/cm$^3$-50 g/cm$^3$, 0.3 g/cm$^3$-40 g/cm$^3$, 0.4 g/cm$^3$-30 g/cm3, 0.5 g/cm$^3$-20 g/cm$^3$, etc. In some embodiments, the mass portion may be implemented as a metal (e.g., an iron, a copper, or a metal alloy, etc.) block, an encapsulating liquid, etc., or a device such as a battery, a circuit board, etc. of the acoustic output apparatus. In some embodiments, the mass portion may be connected to the elastic member. Exemplary connections may include a bolt connection, a riveting, an interference fit, a snap connection, a bonding, an injection molding, a welding, a magnetic attraction, or the like, or any combination thereof. In some embodiments, both the mass portion and the elastic member may have any shape, such as a regular structure such as a cylinder, a cuboid, a cone, a truncated cone, and a sphere, or an irregular structure.

Figure 11:
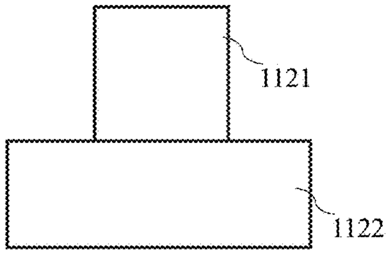
FIG. 11 is a schematic diagram illustrating an exemplary elastic member connected to a mass portion according to some embodiments of the present disclosure.

FIG. 11 is a schematic diagram illustrating an exemplary elastic member connected to a mass portion according to some embodiments of the present disclosure. As shown in FIG. 11, the mass portion 1122 may be connected to one end of the elastic member 1121. The other end of the elastic member 1121 may be further connected to a piezoelectric structure (not shown in FIG. 6).

Figure 12:
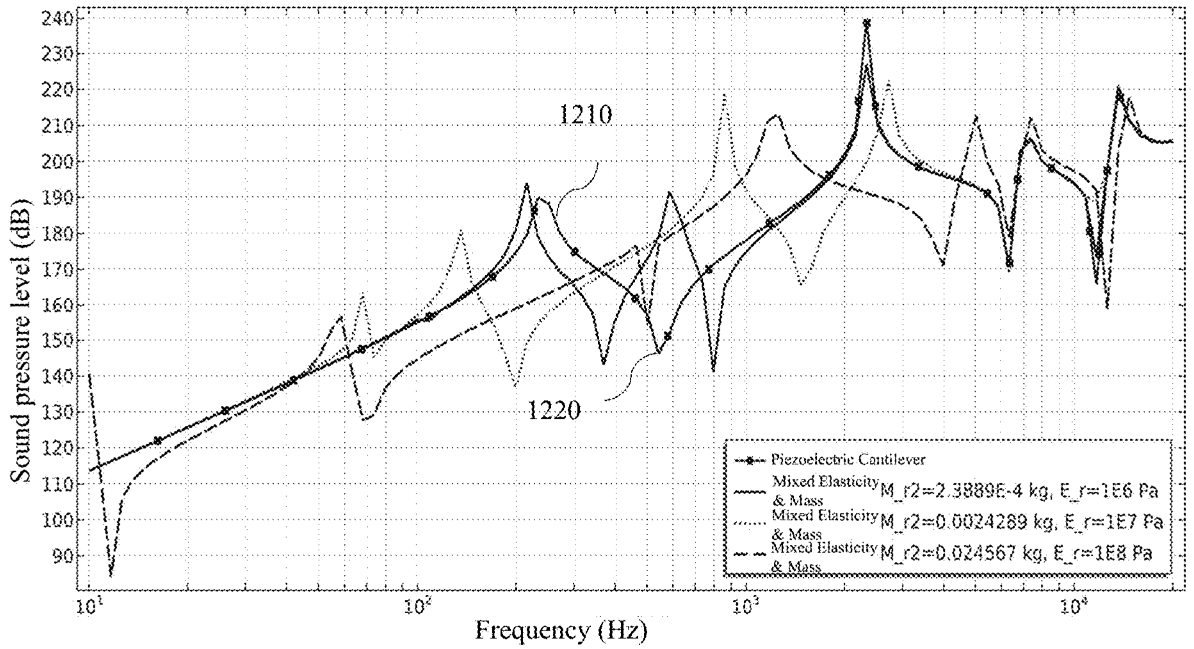
FIG. 12 is a graph illustrating vibration response curves of a beam structure at a first position when the beam structure is connected to a mass element in which an elastic portion is separated from a mass portion according to some embodiments of the present disclosure.

FIG. 12 is a graph illustrating vibration response curves of a beam structure at a first position when the beam structure is connected to a mass element in which an elastic portion is separated from a mass portion according to some embodiments of the present disclosure. As shown in FIG. 12, "M_r2=2.3889E−4 kg, E_r=1E6 Pa" represents the vibration response curve at the first position when the total mass of the mass element is 0.23889 g, and the elastic modulus between the mass element and the beam structure is $10^6$ Pa. According to FIG. 12, when different mass elements in which the elastic portions are separated from the mass portion are connected to the beam structure, in the range of 100 Hz-1000 Hz, the resonance valley 1220 in the vibration response curves of the beam structure at the first position have been effectively improved, and the amplitude difference between the resonance peak 1210 and the resonance valley 1220 have been reduced. In addition, as the mass of the mass element increases, the resonance peak appearing in the low frequency range (e.g., 80 Hz-300 Hz) moves to the zero point of the abscissa. Correspondingly, the low frequency sensitivity of the acoustic output apparatus may decrease. In some embodiments, in order to ensure the low frequency sensitivity of the acoustic output apparatus, the total mass of the mass element in which the elastic portion is separated from the mass portion may be in a target mass range. For example, the target mass range may include 0.01 g-50 g, 0.0.2 g-40 g, 0.03 g-30 g, 0.04 g-20 g, 0.05 g-10 g, 0.07 g-8 g, 0.09 g-6 g, 0.1 g-6 g, 0.2 g-6 g, 0.5 g-6 g, 1 g-5 g, etc. In some embodiments, according to FIG. 7 and FIG. 12, to achieve a similar resonance valley improvement at the same frequency, the mass required when the elastic portion is separated from the mass portion may be less than that when the elastic portion is mixed with the mass portion. In some embodiments, in view of the portability of the acoustic output apparatus and the wearing comfort of the human body, in order to achieve the same sound quality optimization and reduce the weight of the acoustic output apparatus, a mass element in which the elastic portion is separated from the mass portion may be adopted.

It should be understood that the examples provided in FIGS. 6-12 are for illustrative purposes only and are not intended to limit the scope of the present disclosure. Various variations and modifications may be made by those skilled in the art under the guidance of the present disclosure, for example, the pore structure 1023 may also be non-uniformly distributed in the elastic structure. As another example, in the mass element in which the mass portion is separated from the elastic portion, the mass portion may be disposed on a side surface of the elastic portion. And these variations and modifications may fall within the protection scope of the present description.

Figure 13:
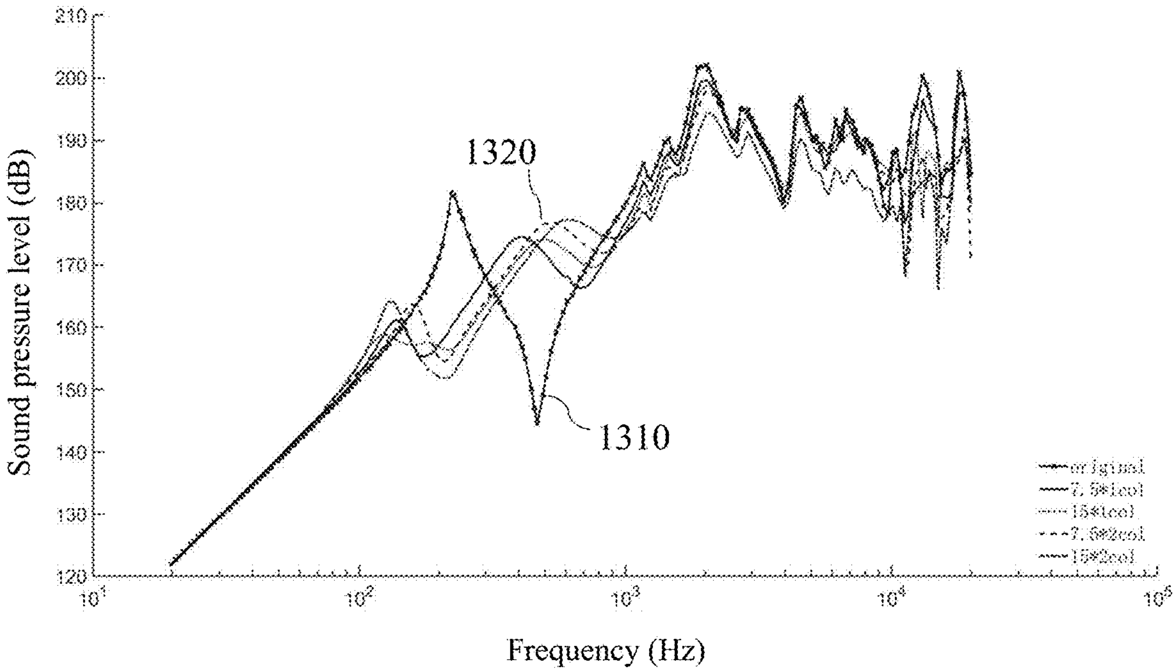
FIG. 13 is a graph illustrating vibration response curves of a piezoelectric structure at a first position when the mass of a mass element is centrally distributed at a second position of the piezoelectric structure according to some embodiments of the present disclosure.

In some embodiments, the mass of the mass element may be centrally distributed at the second position of the piezoelectric structure. The mass element being centrally distributed may refer to that the mass of the mass element is concentrated in a region where the second position is located (e.g., a region with the second position as a geometric center). In some embodiments, a size (e.g., an area, a side length, a diameter, etc.) of the region may be less than a preset value. For example, the region may be a square region and a side length of the square region may be less than 25 mm, 20 mm, 18 mm, 16 mm, 12 mm, or the like. As another example, the region may be a circular region, and a diameter of the circular region may be less than 25 mm, 20 mm, 18 mm, 16 mm, 12 mm, or the like. FIG. 13 is a graph illustrating vibration response curves of a piezoelectric structure at a first position when the mass of a mass element is centrally distributed at a second position of the piezoelectric structure according to some embodiments of the present disclosure. FIG. 13 illustrates vibration response curves of the piezoelectric structure at the first position when the mass of the mass element is centrally distributed at the second position and when the mass element and the piezoelectric structure have different elastic coefficients. For example, "7.5*1 col" represents the response curve at the first position when the mass element is connected to the piezoelectric structure through a single row of rectangular foam with a length of 7.5 mm, and "7.5*2 col 1" represents the response curve at the first position when the mass element is connected to the piezoelectric structure through a double-row of rectangular foam with a length of 15 mm. The length of the rectangular foam may refer to the dimension of the rectangular foam along the length direction of the piezoelectric structure (or the beam structure). The rectangular foams of different lengths may have the same width and the same thickness. As the length and/or a count of rows of the rectangular foam increases, the elastic coefficient between the mass element and the piezoelectric structure increases. According to FIG. 13 that, when the mass of the mass element is centrally distributed at the second position, for different elastic coefficients between the mass element and the piezoelectric structure, the resonance valley 1310 of the vibration response curve of the piezoelectric structure at the first position may be effectively improved. In addition, with the increase of the elastic coefficient, the resonance peak 1320 corresponding to the mass element in the middle frequency band moves to the right along the abscissa, and the effect of smooth transition of the damping increases. Therefore, in some embodiments, the frequency corresponding to the resonance peak of the acoustic output apparatus in the middle frequency band and the sensitivity of the acoustic output apparatus in the middle frequency band may be adjusted by adjusting the elasticity of the mass element.

Figure 14:
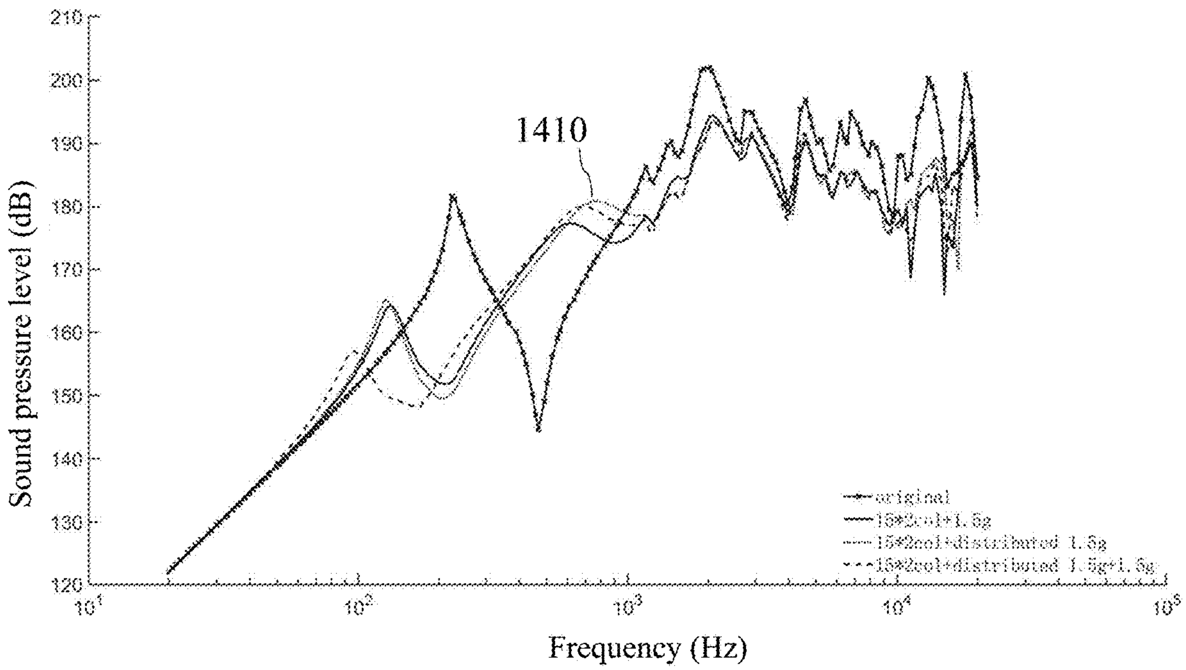
FIG. 14 is a graph illustrating vibration response curves of a piezoelectric structure at a first position when a mass element is centrally or uniformly distributed according to some embodiments of the present disclosure.

In some embodiments, the mass of the mass element may be uniformly distributed around the second position. The mass element being uniformly distributed may refer to that the mass is uniformly distributed in a region around the second position. In some embodiments, an area of the region may be in a preset area range. For example, the preset area range may include 0.1*0.1 $mm^2$-50*50 $mm^2$, 0.5*0.5 $mm^2$-40*40 $mm^2$, 0.5*1 $mm^2$-35*35 $mm^2$, 1*1 $mm^2$-30*30 $mm^2$, 1*2 $mm^2$-30*20 $mm^2$, 2*2 $mm^2$-30*15 $mm^2$, 3*3 $mm^2$-30*10 $mm^2$, etc. FIG. 14 is a graph illustrating vibration response curves of a piezoelectric structure at a first position when a mass element is centrally or uniformly distributed according to some embodiments of the present disclosure. FIG. 14 illustrates vibration response curves at the first position when different masses are centrally or uniformly distributed at the second position and when the elastic coefficient between the mass element and the piezoelectric structure is the same. For example, "15*2 col+1.5 g" represents the response curve at the first position when the mass element is connected to the piezoelectric structure through a double-row rectangular foam with a length of 15 mm, the mass element is 1.5 g and is centrally distributed, "15*2 col+distributed 1.5 g" represents the response curve at the first position when the mass element is connected to the piezoelectric structure through a double-row rectangular foam with a length of 15 mm, the mass element is 1.5 g and uniformly distributed. As shown in FIG. 14, compared with the vibration response curve when the mass element is centrally distributed, the frequency of the resonance peak 1410 of the vibrations at the first position increases when the mass element is uniformly distributed, and the damping effect is enhanced. When the centrally distributed mass is added to the uniformly distributed mass, the frequency of the resonance peak 1410 of the vibrations at the first position decreases and the damping effect remains. Therefore, in some embodiments, the frequency corresponding to the resonance peak of the acoustic output apparatus in the middle frequency band may be adjusted by adjusting the mass distribution of the mass element. In some embodiments, when the mass of the mass element is constant, compared with the mass centrally distributed at the second position of the piezoelectric structure, the mass uniformly distributed around the second position of the piezoelectric structure may increase the frequency corresponding to the resonance peak of the acoustic output apparatus in the middle frequency band and improve the sensitivity of acoustic output apparatus in the middle frequency band.

Figure 15:
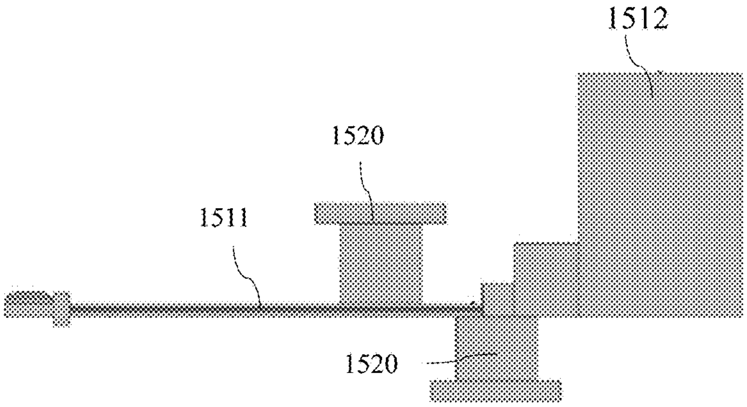
FIG. 15 is a schematic diagram illustrating a piezoelectric structure connected to a plurality of mass elements according to some embodiments of the present disclosure.
Figure 16:
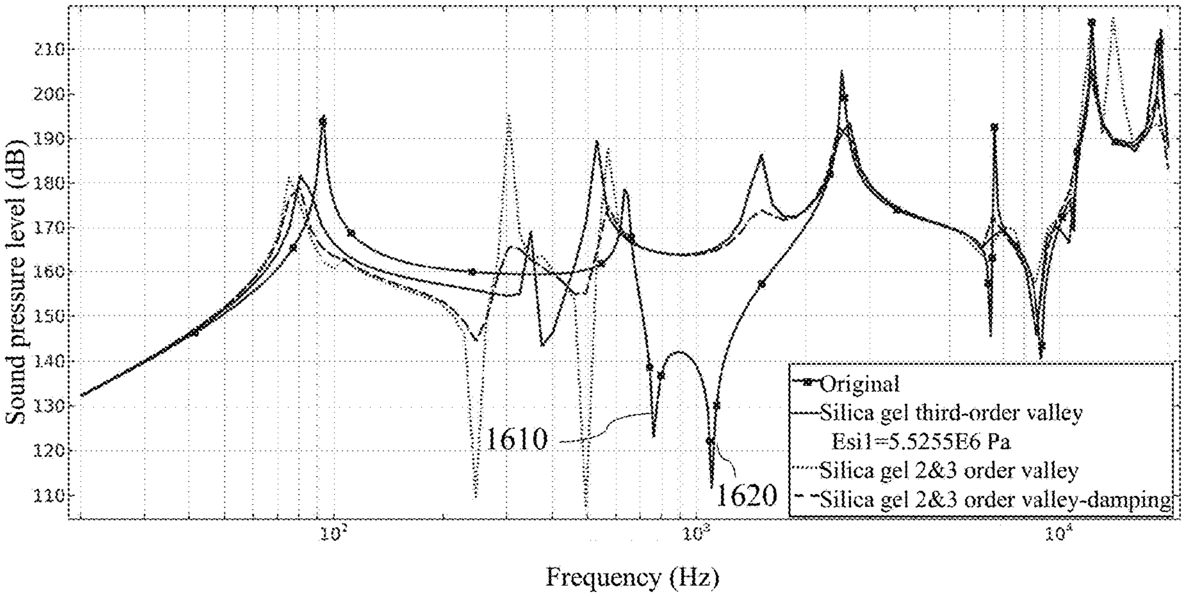
FIG. 16 is a graph illustrating vibration response curves of a piezoelectric structure at a first position when the piezoelectric structure is connected to a plurality of mass elements according to some embodiments of the present disclosure.

FIG. 15 is a schematic diagram illustrating a piezoelectric structure connected to a plurality of mass elements according to some embodiments of the present disclosure. In some embodiments, as shown in FIG. 15, the piezoelectric structure 1511 may have a plurality of second positions, and the vibration element 1512 may be connected to the piezoelectric structure 1511 at the first position of the piezoelectric structure 1511. Mass elements 1520 may be connected to the plurality of second positions, respectively. The plurality of second positions on the piezoelectric structure 1511 may be determined based on vibration modes of the piezoelectric structure 1511 in different target frequency ranges. For example, according to FIGS. 3A and 3B and the description thereof, in a certain target frequency range, the second position may be disposed at an antinode position when the piezoelectric structure 1511 resonates in the target frequency range. FIG. 16 is a graph illustrating vibration response curves of a piezoelectric structure at a first position when the piezoelectric structure is connected to a plurality of mass elements according to some embodiments of the present disclosure. As shown in FIG. 16, "silica gel third-order valley Esi1=5.5255E6 Pa" represents the vibration response curve at the first position when a mass element with an elastic modulus of 5.5255*$10^6$ Pa is connected to the antinode region of the beam structure in a frequency corresponding to the third-order valley. According to FIG. 5D and FIG. 16, when mass elements are connected to the antinode regions of the beam structure in the frequencies corresponding to the second-order valley and third-order valley, respectively, both the second-order valley 1610 and the third-order valley 1620 of the vibrations of the piezoelectric structure 1511 at the first position are improved. In addition, a damping mass element may flatten the vibration response curve at the first position, thereby improving the sound quality of the acoustic output apparatus. Therefore, by adding a plurality of mass elements to the piezoelectric structure, the output of the acoustic output apparatus in a plurality of frequency bands may be improved, which may improve the sound quality in the whole frequency band.

Figure 17:
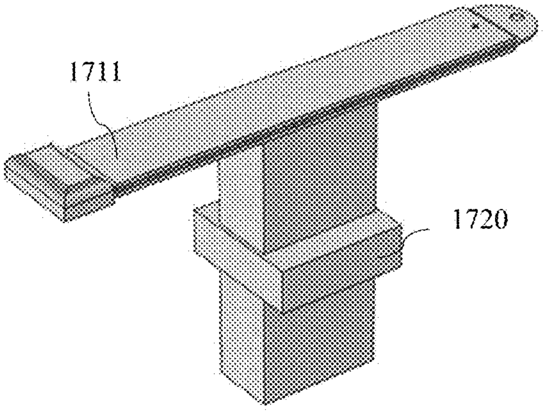
FIG. 17 is a schematic diagram illustrating a mass element elastically connected to a piezoelectric structure and a housing according to some embodiments of the present disclosure.

In some embodiments, the mass element may be connected to other assemblies of the acoustic output apparatus (e.g., a battery, a housing, etc.) to achieve fixation of the mass element. In some embodiments, the fixation of the mass element may prevent the vibration mode of the vibrating assembly from being affected by the vibrations of the mass element. In some embodiments, the connection between the mass element and the acoustic output apparatus may be an elastic connection. The elastic connection may reduce vibrations of the acoustic output apparatus affecting the vibrations of the vibration assembly through the mass element, and reduce the connection between the mass element and the acoustic output apparatus from affecting the vibrations of the mass element. In some embodiments, the mass element may be elastically connected to the housing of the acoustic output apparatus. In some embodiments, the elastic connection between the mass element and the housing may be similar to the elastic connection between the mass element and the piezoelectric structure, which may not be repeated here. FIG. 17 is a schematic diagram illustrating a mass element elastically connected to a piezoelectric structure and a housing according to some embodiments of the present disclosure. As shown in FIG. 17, one side of the mass element 1720 may be elastically connected to the piezoelectric structure 1711 through an elastic structure or an elastic member, and the other side of the mass element 1720 may be elastically connected to the housing (not shown in FIG. 17) through an elastic structure or an elastic member.

Figure 18:
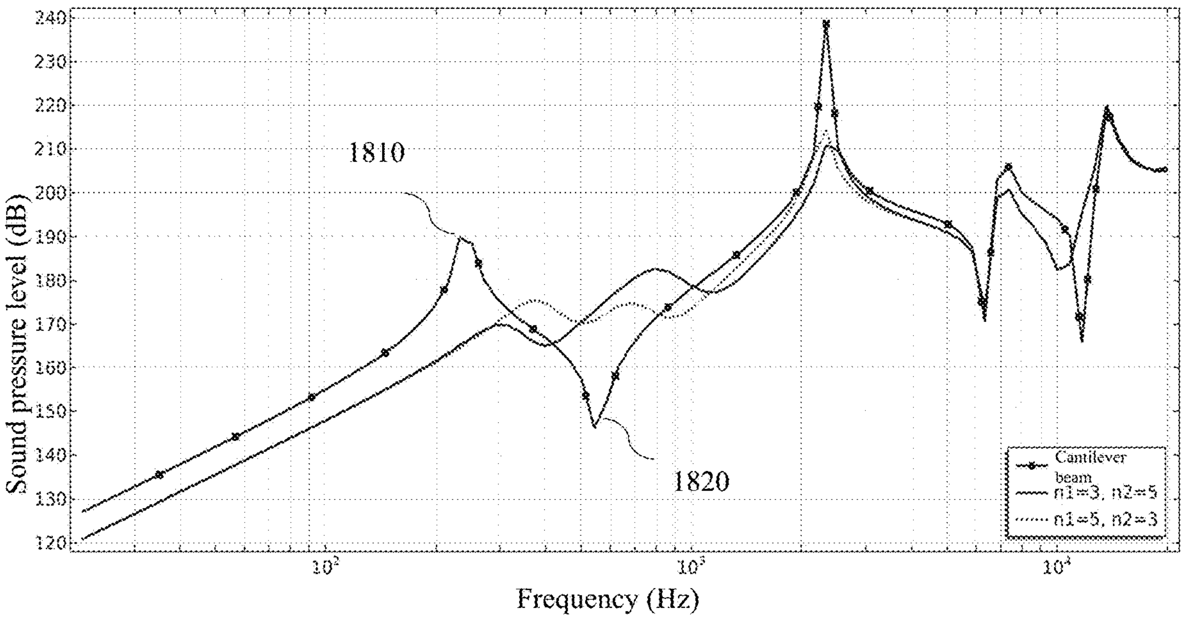
FIG. 18 is a graph illustrating vibration response curves of a piezoelectric structure at a first position when a first elastic coefficient is different from a second elastic coefficient according to some embodiments of the present disclosure.

In some embodiments, the adjustment of the mass element to the vibration mode of the piezoelectric structure at the first position may be realized by adjusting the elasticity between the mass element and the piezoelectric structure and the elasticity between the mass element and the housing. In some embodiments, an elastic coefficient between the mass element and the piezoelectric structure (i.e., a first elastic coefficient) may be less than an elastic coefficient between the mass element and the housing (i.e., a second elastic coefficient), so that the amplitude difference between the resonance peak and the resonance valley of the vibrations at the first position in the target frequency range may be reduced, and the vibration response curve of the first position may be smoother. FIG. 18 is a graph illustrating vibration response curves of a piezoelectric structure at a first position when a first elastic coefficient is different from a second elastic coefficient according to some embodiments of the present disclosure. The elasticity corresponding to FIG. 18 may be achieved by rectangular foam. As shown in FIGS. 18, n1 and n2 represent a count of layers of rectangular foam between the mass element and the piezoelectric structure and a count of layers of rectangular foam between the mass element and the housing, respectively. The more layers of rectangular foam, the smaller the corresponding elastic modulus. As shown in FIG. 18, the first elastic coefficient being larger or smaller than the second elastic coefficient may reduce the amplitude difference between the resonance peak 1810 and the resonance valley 1820 of the vibration at the first position in the middle frequency band and low frequency band. In addition, the first elastic coefficient being smaller than the second elastic coefficient may cause the vibration response curve of the first position smoother, which may improve the sound quality of the acoustic output apparatus. In some embodiments, a ratio of the second elastic coefficient to the first elastic coefficient may be less than a preset threshold. For example, the ratio of the second elastic coefficient to the first elastic coefficient may be less than 50. As another example, the ratio of the second elastic coefficient to the first elastic coefficient may be less than 40. As another example, the ratio of the second elastic coefficient to the first elastic coefficient may be less than 30. As another example, the ratio of the second elastic coefficient to the first elastic coefficient may be less than 20. As another example, the ratio of the second elastic coefficient to the first elastic coefficient may be less than 10. As another example, the ratio of the second elastic coefficient to the first elastic coefficient may be less than 5.

In some embodiments, a mass ratio mr of the mass element to the vibration assembly may be adjusted such that the mass element may reduce the amplitude difference between the resonance peak and the resonance valley of the vibration response curve at the first position in the target frequency range. In some embodiments, the mass ratio mr of the mass element to the vibration assembly may also be adjusted such that the vibration response curve in frequency bands outside the target frequency range (e.g., a region after the resonance peak corresponding to the mass element) may be smooth, thereby improving the sound quality of the corresponding frequency bands. The mass of the vibration assembly may refer to the total mass of the piezoelectric structure and the vibration element.

Figure 19:
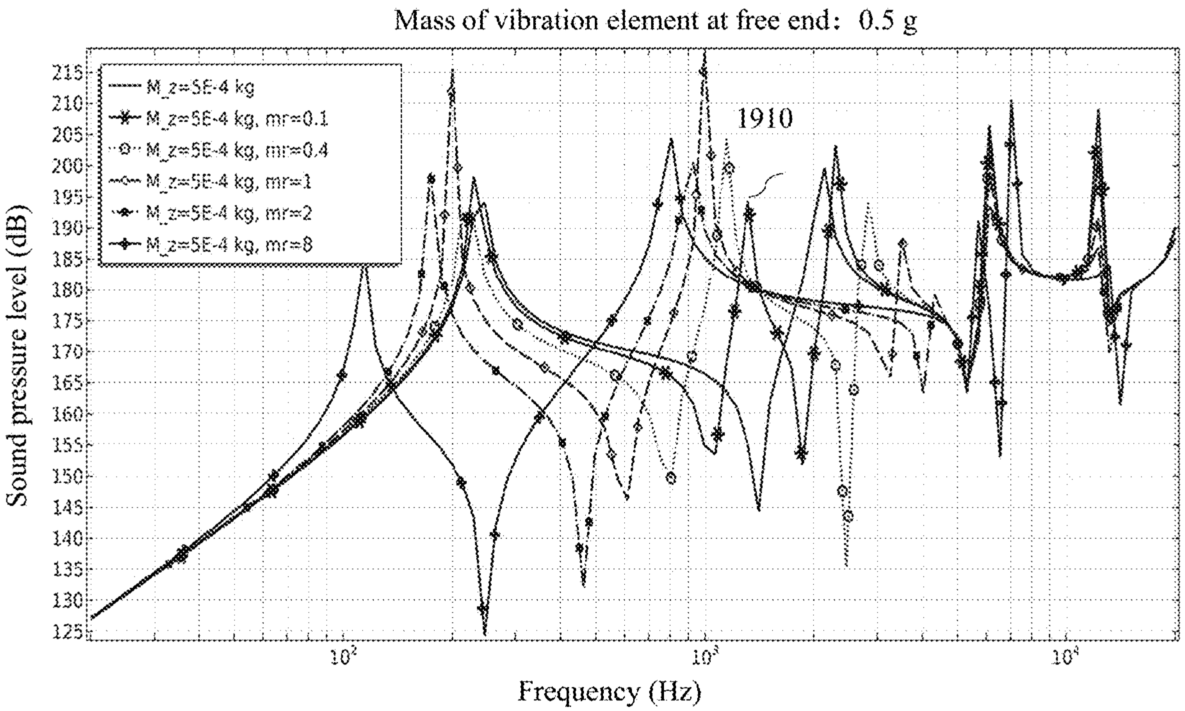
FIG. 19 is a graph illustrating vibration response curves of a piezoelectric structure at a first position corresponding to different mr values when the mass of a vibration element is 0.5 g according to some embodiments of the present disclosure.

FIG. 19 is a graph illustrating vibration response curves of a piezoelectric structure at a first position corresponding to different mr values when the mass of a vibration element is 0.5 g according to some embodiments of the present disclosure. As shown in FIG. 19, “M_z=5E−4 kg, mr=0.1” represents the vibration response curve at the first position when the mass of the vibration element is 0.5 g and mr is 0.1. According to FIG. 19, in some embodiments, when the mass of the vibration element is in the range of 0.1 g-0.9 g, mr may be less than 5. In some embodiments, when the mass of the vibration element is in the range of 0.1 g-0.9 g, mr may be less than 2. In some embodiments, when the mass of the vibration element is in the range of 0.1 g-0.9 g, mr may be less than 1. In some embodiments, in order to smooth the vibration response curve in the middle frequency band after the resonance peak 1910 corresponding to the mass element, mr may be larger than 1.

Figure 20:
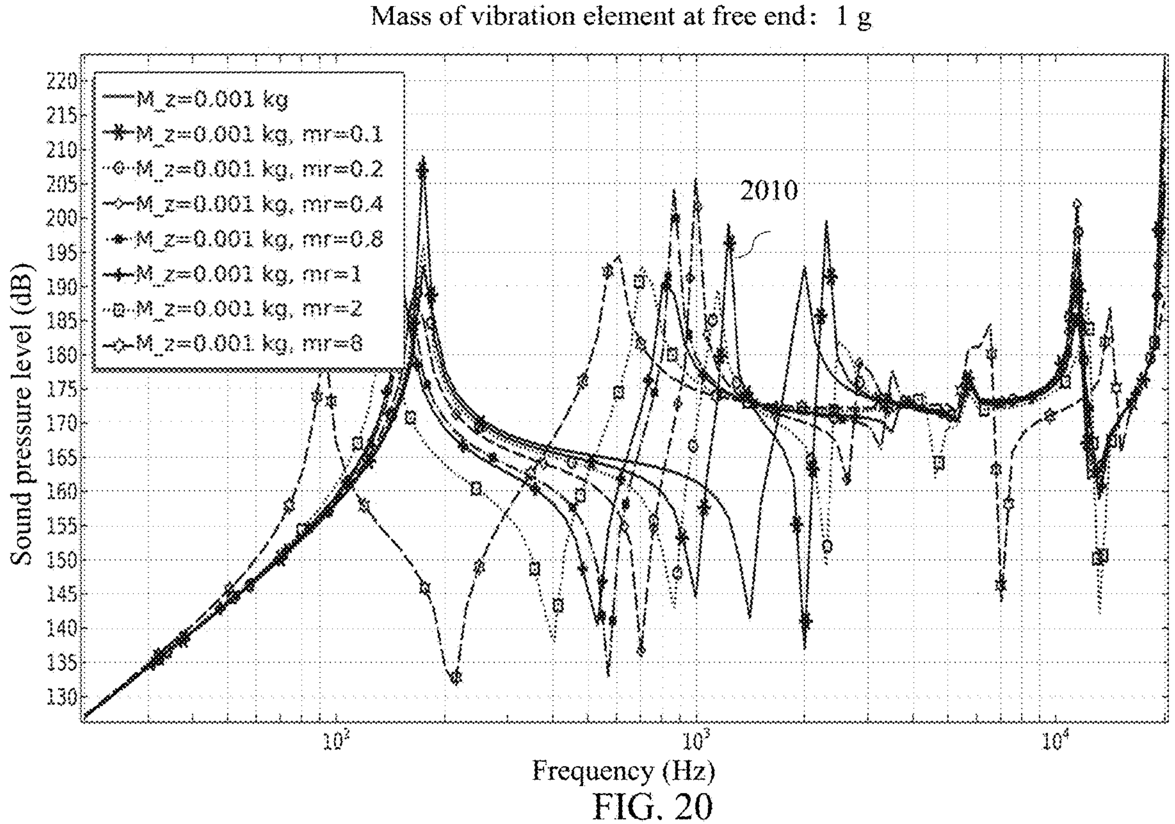
FIG. 20 is a graph illustrating vibration response curves of a piezoelectric structure at a first position corresponding to different mr values when the mass of a vibration element is 1 g according to some embodiments of the present disclosure.

FIG. 20 is a graph illustrating vibration response curves of a piezoelectric structure at a first position corresponding to different mr values when the mass of a vibration element is 1 g according to some embodiments of the present disclosure. According to FIG. 19, in some embodiments, when the mass of the vibration element is in the range of 0.9 g-1.8 g, mr may be less than 2. In some embodiments, when the mass of the vibration element is in the range of 0.9 g-1.8 g, mr may be less than 1.5. In some embodiments, when the mass of the vibration element is in the range of 0.9 g-1.8 g, mr may be less than 0.8. In some embodiments, when the mass of the vibration element is in the range of 0.9 g-1.8 g, in order to smooth the vibration response curve of the middle frequency band after the resonance peak 2010 corresponding to the mass element, mr may be larger than 0.8.

Figure 21:
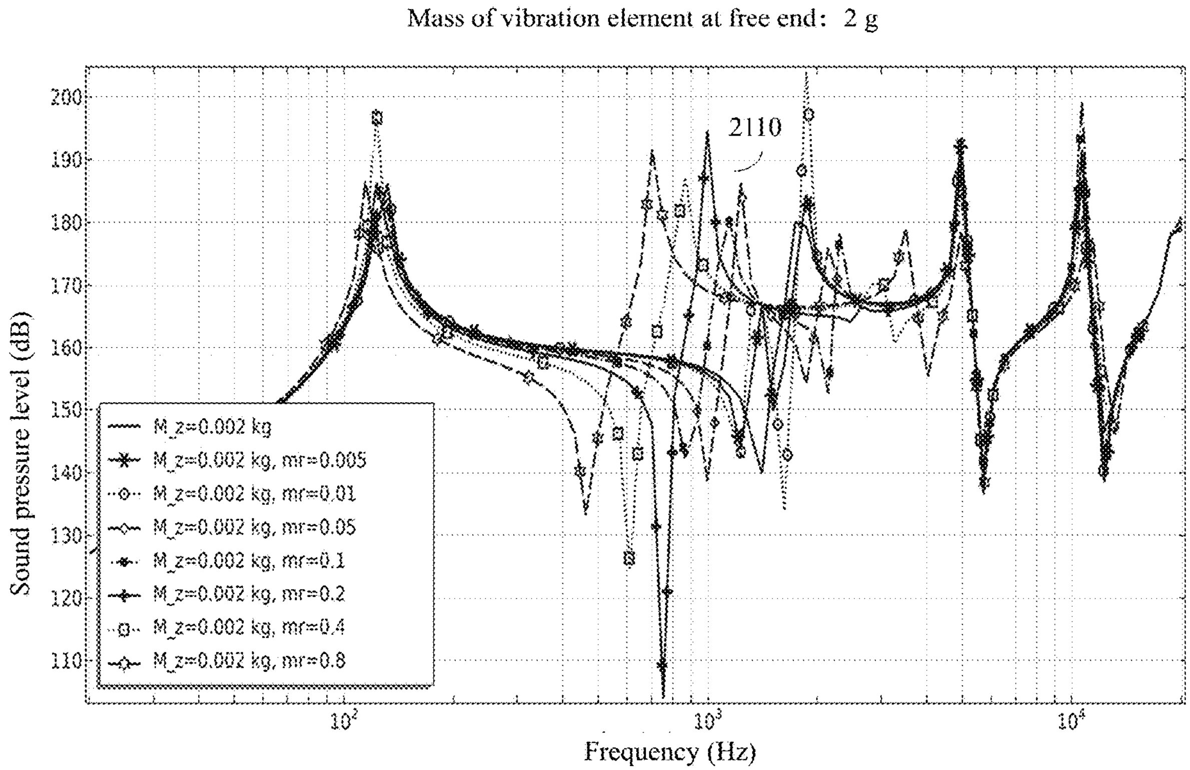
FIG. 21 is a graph illustrating vibration response curves of a piezoelectric structure at a first position corresponding to different mr values when the mass of a vibration element is 2 g according to some embodiments of the present disclosure.

FIG. 21 is a graph illustrating vibration response curves of a piezoelectric structure at a first position corresponding to different mr values when the mass of a vibration element is 2 g according to some embodiments of the present disclosure. According to FIG. 19, in some embodiments, when the mass of the vibration element is in the range of 1.8 g-5 g, mr may be less than 1. In some embodiments, when the mass of the vibration element is in the range of 1.8 g -5 g, mr may be less than 0.5. In some embodiments, when the mass of the vibration element is in the range of 1.8 g-5 g, mr may be less than 0.2. In some embodiments, when the mass of the vibration element is in the range of 1.8 g -5 g, in order to smooth the vibration response curve in the middle frequency band after the resonance peak 2110 corresponding to the mass element, mr may be larger than 0.2.

It should be noted that different embodiments may have different beneficial effects. In different embodiments, the possible beneficial effects may be any one or a combination of the beneficial effects described above, or any other beneficial effects. For example, the sound quality of the acoustic output device may be optimally optimized by simultaneously adjusting the mass ratio mr of the mass element to the vibration assembly and the distribution manner of the mass of the mass element at the second position.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure, or characteristic described in connection with the embodiment is included in at least one embodiment of the present disclosure. Therefore, it is emphasized and should be appreciated that two or more references to “an embodiment,” “one embodiment,” or “an alternative embodiment” in various portions of this disclosure are not necessarily all referring to the same embodiment. Furthermore, the particular features, structures or characteristics may be combined as suitable in one or more embodiments of the present disclosure.

In addition, unless explicitly stated in the claims, the order in which the present disclosure deals with elements and sequences, the use of numbers and letters, or the use of other names, is not intended to limit the order of the procedures and methods of the present disclosure. While the foregoing disclosure discusses by way of various examples some embodiments of the invention presently believed to be useful, it is to be understood that such details are for purposes of illustration only and that the appended claims are not limited to the disclosed embodiments, but rather the claims are intended to cover all modifications and equivalent combinations that come within the spirit and scope of the embodiments of the present disclosure For example, although the system components described above may be implemented by hardware devices, they may also be implemented by software-only solutions, such as installing the described systems on existing servers or mobile devices.

Similarly, it should be noted that, in order to simplify the expression disclosed in the present disclosure, thereby helping the understanding of one or more embodiments of the invention, in the foregoing description of the embodiments of the present disclosure, various features are sometimes merged into one embodiment, drawing or description thereof. However, this method of disclosure does not imply that the subject matter of the application requires more features than those mentioned in the claims. Indeed, there are fewer features of an embodiment than all of the features of a single embodiment disclosed above.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus, comprising:

a vibration assembly, including a piezoelectric structure and a vibration element, wherein, the piezoelectric structure is configured to convert an electrical signal into mechanical vibrations; and the vibration element is connected to the piezoelectric structure at a first position of the piezoelectric structure and is configured to receive the mechanical vibrations to generate an acoustic signal; and a mass element, the mass element being connected to the piezoelectric structure at a second position of the piezoelectric structure; wherein the piezoelectric structure has a beam structure including a fixed end, and the first position and the second position are different positions in a length direction of the beam structure.

2. The acoustic output apparatus of claim 1, wherein, in a range of 50 Hz-5000 Hz, a vibration response curve of the piezoelectric structure at the first position has a resonance peak and a resonance valley, and the mass element reduces an amplitude difference between the resonance peak and the resonance valley.

3. The acoustic output apparatus of claim 1, wherein a difference between a vibration acceleration level of the beam structure at the first position and a vibration acceleration level of the fixed end is larger than 20 dB.

4. The acoustic output apparatus of claim 1, wherein a ratio of a distance between the second position and the fixed end of the beam structure to a length of the beam structure is larger than ⅓.

5. The acoustic output apparatus of claim 1, wherein a ratio of an elastic coefficient between the mass element and the piezoelectric structure to a mass of the mass element is in a range of $(100\pi)^2$-$(10000\pi)^2$.

6. The acoustic output apparatus of claim 1, wherein a mass of the mass element is centrally distributed at the second position or uniformly distributed around the second position.

7. The acoustic output apparatus of claim 1, wherein a mass of the mass element is in a range of 0.1 g-6 g.

8. The acoustic output apparatus of claim 7, wherein an elastic coefficient between the mass element and the piezoelectric structure is in a range of 9 N/m-$6\times10^6$ N/m.

9. The acoustic output apparatus of claim 1, wherein the mass element is further connected to a housing of the acoustic output apparatus.

10. The acoustic output apparatus of claim 9, wherein a ratio of an elastic coefficient between the mass element and the housing to an elastic coefficient between the mass element and the piezoelectric structure is less than 10.

11. The acoustic output apparatus of claim 9, wherein an elastic coefficient between the mass element and the piezoelectric structure is less than an elastic coefficient between the mass element and the housing.

12. The acoustic output apparatus of claim 1, wherein the mass of the vibration element is in a range of 0.1 g-0.9 g, and a ratio of the mass of the mass element to the mass of the vibration assembly is less than 5.

13. The acoustic output apparatus of claim 1, wherein the mass of the vibration element is in a range of 0.9 g-1.8 g, and a ratio of the mass of the mass element to the mass of the vibration assembly is less than 2.

14. The acoustic output apparatus of claim 1, wherein the mass of the vibration element is in a range of 1.8-5 g, and a ratio of the mass of the mass element to the mass of the vibration in is less than 1.

15. The acoustic output apparatus of claim 1, wherein the mass element is elastically connected to the piezoelectric structure through an elastic member.

16. The acoustic output apparatus of claim 1, wherein at least a portion of the mass element has an elastic structure, and the mass element is elastically connected to the piezoelectric structure through the elastic structure.

17. The acoustic output apparatus of claim 16, wherein the elastic structure includes a pore structure.

18. The acoustic output apparatus of claim 17, wherein a damping material is disposed in the pore structure.

19. The acoustic output apparatus of claim 1, wherein the acoustic output apparatus includes a piezoelectric ceramic driven acoustic output apparatus.

* * * * *